United States Patent
Patel et al.

(10) Patent No.: US 11,528,920 B2
(45) Date of Patent: *Dec. 20, 2022

(54) METHODS FOR TREATING A DIVIDED CHEESE PRODUCT AND COMPOSITIONS THEREOF

(71) Applicant: Allied Blending LP, Keokuk, IA (US)

(72) Inventors: Ashok Patel, Valley Park, MO (US); John Fannon, St. Louis, MO (US); Randy Schmelzel, Quincy, IL (US)

(73) Assignee: Allied Blending LP, Keokuk, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/315,864

(22) Filed: May 10, 2021

(65) Prior Publication Data

US 2021/0259267 A1 Aug. 26, 2021

Related U.S. Application Data

(63) Continuation of application No. 16/170,917, filed on Oct. 25, 2018, now Pat. No. 11,033,039, which is a (Continued)

(51) Int. Cl.
*A23C 19/16* (2006.01)
*A23C 19/09* (2006.01)
(Continued)

(52) U.S. Cl.
CPC .......... *A23C 19/16* (2013.01); *A23C 19/0917* (2013.01); *A23C 19/0921* (2013.01);
(Continued)

(58) Field of Classification Search
CPC . A23C 19/16; A23C 19/0917; A23C 19/0684; A23V 2002/00; A23V 2200/208;
(Continued)

(56) References Cited

U.S. PATENT DOCUMENTS 3,694,231 A 9/1972 Izzo
5,626,893 A 5/1997 Reddy
(Continued)

FOREIGN PATENT DOCUMENTS

| EP | 0272923 A2 | 6/1988 |
|---|---|---|
| EP | 1887885 A2 | 2/2008 |
| WO | 2018200836 | 11/2018 |

OTHER PUBLICATIONS

Gass declaration from U.S. Appl. No. 13/078,673 dated Jan. 6, 2014 (Year: 2014).*

(Continued)

*Primary Examiner* — Katherine D LeBlanc
(74) *Attorney, Agent, or Firm* — Dennis A. Bennett; C A Schlecht; Brock Levin

(57) ABSTRACT

Disclosed herein is an anticaking agent for cheese, comprising one or more dairy ingredients; and one or more non-dairy ingredients. When applied the anticaking agent is applied to a divided cheese, it has low visibility on the divided cheese, prevents caking of the divided cheese, and browns similarly to divided cheese without the anticaking agent when baked in an impinger oven at between 425° F. and 450° F. for 5 minutes. Also disclosed are food products containing an anticaking agent described herein, and methods for treating divided cheese for anticaking using an anticaking agent described herein.

21 Claims, 4 Drawing Sheets

Related U.S. Application Data continuation-in-part of application No. 15/963,781, filed on Apr. 26, 2018, now abandoned.

(60) Provisional application No. 62/490,394, filed on Apr. 26, 2017.

(51) Int. Cl.
*A23P 10/43* (2016.01)
*A23C 19/068* (2006.01)
*A23C 19/14* (2006.01)
*A23C 19/072* (2006.01)

(52) U.S. Cl.
CPC .............. *A23C 19/14* (2013.01); *A23P 10/43* (2016.08); *A23C 19/0684* (2013.01); *A23C 19/072* (2013.01); *A23C 2250/15* (2013.01); *A23V 2002/00* (2013.01); *A23V 2200/208* (2013.01); *A23V 2250/1578* (2013.01); *A23V 2250/1628* (2013.01); *A23V 2250/21* (2013.01); *A23V 2250/5108* (2013.01); *A23V 2250/5118* (2013.01); *A23V 2250/61* (2013.01)

(58) Field of Classification Search
CPC .... A23V 2250/1578; A23V 2250/1628; A23V 2250/21; A23V 2250/5108; A23V 2250/5118; A23V 2250/61
See application file for complete search history.

(56) References Cited

U.S. PATENT DOCUMENTS

| | | | |
|---|---|---|---|
| 5,747,078 | A | 5/1998 | De Jong |
| 5,895,680 | A | 4/1999 | Cirigliano |
| 6,126,974 | A | 10/2000 | Ang |
| 6,261,625 | B1 | 7/2001 | Pickford |
| 6,426,102 | B1 | 7/2002 | Isom |
| 7,279,192 | B2 | 10/2007 | Abboud |
| 8,017,169 | B2 | 9/2011 | Trecker |
| 10,624,361 | B1 | 4/2020 | Stange |
| 11,033,039 | B2 | 6/2021 | Patel |
| 11,096,400 | B2 | 8/2021 | Stange |
| 2003/0021873 | A1 | 1/2003 | Willits |
| 2004/0109927 | A1 | 6/2004 | Ang |
| 2004/0213884 | A1 | 10/2004 | Abboud |
| 2005/0221029 | A1 | 10/2005 | Cater |
| 2006/0115567 | A1 | 6/2006 | Hoegh |
| 2006/0193954 | A1 | 8/2006 | Pruett, Jr. |
| 2006/0210694 | A1 | 9/2006 | Chappell |
| 2007/0275127 | A1 | 11/2007 | Ball |
| 2008/0069873 | A1 | 3/2008 | Pearnchob |
| 2008/0299103 | A1 | 12/2008 | George |
| 2010/0330369 | A1 | 12/2010 | Veelaert |
| 2011/0212149 | A1 | 9/2011 | Lobee |
| 2011/0229622 | A1 | 9/2011 | Merrill |
| 2011/0244105 | A1 | 10/2011 | Galer |
| 2013/0337142 | A1 | 12/2013 | Fannon |
| 2015/0079224 | A1 | 3/2015 | Ball |
| 2018/0310582 | A1 | 11/2018 | Patel |
| 2019/0059407 | A1 | 2/2019 | Patel |
| 2021/0084923 | A1 | 3/2021 | Stange |
| 2021/0337819 | A1 | 11/2021 | Stange |

OTHER PUBLICATIONS

Akoh, C. "Fat Replacers", Food Technol., 52(3):47-53, (1998).
Ash, M. "Handbook of Fillers, Extenders and Diluents", Second Edition, Compiled by Michael and Irene Ash, 2007, Synapse Information Resources, Inc, p. 179.
Declaration of Andrea Stange, PhD, Under 37 C.F.R. § 1.132, date of signature Feb. 20, 2020; 9 pages.
Declaration of Paul V. Gass Under 37 C.F.R. §1.132, date of signature Dec. 20, 2013; 12 pages.
International Application No. PCT/US2018/029601, International Search Report and Written Opinion of the International Searching Authority dated Aug. 8, 2018, 11 pages.
International Application No. PCT/US2013/045810; International Preliminary Report on Patentability, date of issuance Dec. 16, 2014; 10 pages.
International Application No. PCT/US2013/045810; International Search Report and Written Opinion of the International Searching Authority, dated Sep. 13, 2013; 14 pages.
International Application No. PCT/US2018/029601; International Preliminary Report on Patentability, date of issuance Nov. 7, 2019; 8 pages.
U.S. Appl. No. 13/736,693; Applicant-Initiated Interview Summary, dated Dec. 20, 2017; 3 pages.
U.S. Appl. No. 13/736,693; Application as filed, dated Jan. 8, 2013; 16 pages.
U.S. Appl. No. 13/736,693; Final Office Action, dated Aug. 28, 2014; 13 pages.
U.S. Appl. No. 13/736,693; Final Office Action, dated Jun. 15, 2017; 11 pages.
U.S. Appl. No. 13/736,693; Non-Final Office Action, dated Feb. 14, 2014; 16 pages.
U.S. Appl. No. 13/736,693; Non-Final Office Action, dated Oct. 7, 2015; 12 pages.
U.S. Appl. No. 13/736,693; Notice of Appeal, dated Dec. 14, 2017; 2 pages.
U.S. Appl. No. 13/917,902; Advisory Action, dated May 3, 2018; 4 pages.
U.S. Appl. No. 13/917,902; Applicant-Initiated Interview Summary, dated Apr. 12, 2018; 3 pages.
U.S. Appl. No. 13/917,902; Applicant-Initiated Interview Summary, dated May 24, 2018; 3 pages.
U.S. Appl. No. 13/917,902; Examiner's Answer to Appeal Brief, dated Sep. 24, 2018; 5 pages.
U.S. Appl. No. 13/917,902; Final Office Action, dated Jan. 31, 2018; 5 pages.
U.S. Appl. No. 13/917,902; Non-Final Office Action, dated May 24, 2017; 8 pages.
U.S. Appl. No. 13/917,902; Non-Final Office Action, dated Sep. 1, 2016; 10 pages.
U.S. Appl. No. 15/963,781; Non-Final Office Action, dated Sep. 3, 2019; 32 pages.
U.S. Appl. No. 16/170,917; Final Office Action, dated Jan. 8, 2020; 24 pages.
U.S. Appl. No. 16/170,917; Non-Final Office Action, dated Oct. 4, 2019; 27 pages.
U.S. Appl. No. 16/170,917; Notice of Allowance, dated Feb. 17, 2021; 9 pages.
U.S. Appl. No. 16/577,530; Application as filed, dated Sep. 20, 2019; 32 pages.
U.S. Appl. No. 16/577,530; Non-Final Office Action, dated Jan. 8, 2020; 18 pages.
U.S. Appl. No. 16/577,530; Notice of Allowance, dated Mar. 10, 2020; 11 pages.
U.S. Appl. No. 16/818,251; Non-Final Office Action, dated Oct. 16, 2020; 19 pages.
U.S. Appl. No. 16/818,251; Notice of Allowance, dated Apr. 16, 2021; 8 pages.

\* cited by examiner

METHODS FOR TREATING A DIVIDED CHEESE PRODUCT AND COMPOSITIONS THEREOF

This application claims the benefit of the filing date as a continuation of the U.S. patent application Ser. No. 16/170,917, filed on Oct. 25, 2018, now allowed, which is a continuation-in-part of the U.S. patent application Ser. No. 15/963,781, filed on Apr. 26, 2018, now abandoned, which claims the benefit of priority of U.S. Provisional Patent Application Ser. No. 62/490,394, filed on Apr. 26, 2017, the disclosures of which are each incorporated by reference in their entireties for all purposes.

The present disclosure relates to compositions used for treating divided cheese, for example, to prevent sticking, clumping, or caking and compositions thereof, and related methods.

For convenience, hard and semi-hard cheeses are often sold in diced, shredded, or chunked form. These divided cheeses have a propensity to clump together during storage, especially high moisture or high-fat cheeses, making them difficult to handle. Anticaking agents are often added to divided cheese to prevent sticking.

There are many anticaking compositions commercially available, including ingredients such as celluloses, starches, flours, clays, such as bentonite, metal carbonates, such as calcium carbonate, and silicon dioxide. The pre-existing anticaking additives have several drawbacks, particularly for the divided food product industry. These agents are often expensive and may deteriorate the performance of the cheese in finished products. Additionally, these compositions generate considerable dust during packaging and are a health hazard to workers.

Thus, there remains a need for improved methods for treating divided cheese to prevent sticking, clumping, or caking.

SUMMARY

Accordingly, disclosed herein are anticaking products for use on divided cheese usable at a higher percentage (w/w or wt. %) compared to conventional anticake treatments with no or minimal impact on flavor and textural properties, such as mouthfeel, oiling, shredding, and stringing, while inhibiting excess browning.

The present disclosure provides an anticaking agent for cheese, comprising 20-70 wt. % one or more dairy ingredients; and 30-80 wt. % one or more non-dairy ingredients, wherein the anticaking agent can be applied to divided cheese to prevent caking.

In certain embodiments, the one or more dairy ingredient is chosen from dairy product solids (milk permeate powder, whey permeate powder, deproteinized whey, or combinations thereof), cheese whey powder, sweet dairy whey powder, non-hygroscopic dried whey, whey powder, whey protein concentrate, whey protein isolate, milk protein concentrate, milk protein isolate, whey cream, whey protein-lipid concentrate, rennet casein, calcium caseinate, sodium caseinate, milk minerals, milk calcium, milk calcium phosphate, lactose, skim milk powder, non-fat dry milk, acid casein, and combinations thereof. For example, the one or more dairy ingredients may be chosen from milk permeate powder, whey permeate powder, dried whey, and combinations thereof. In certain embodiments, the anticaking agent comprises 46-70 wt. % milk permeate powder. In certain embodiments, the anticaking agent comprises 60-70 wt. % whey permeate powder. In certain embodiments, the anticaking agent comprises 60-65 wt. % dried whey.

In certain embodiments, in the one or more non-dairy ingredient is chosen from cellulose, sugarcane fiber, calcium sulfate, calcium phosphate, dicalcium phosphate, silicon dioxide, starch, dextrose monohydrate, glucose oxidase, natamycin, potassium sorbate, mineral oil, high oleic sunflower oil, and combinations thereof. In certain embodiments, the anticaking agent comprises 30-60 wt. % one or more non-dairy ingredients. In certain embodiments, the anticaking agent comprises 5-15 wt. % calcium sulfate. In certain embodiments, the anticaking agent comprises 9.5-40 wt. % cellulose. In certain embodiments, the anticaking agent comprises 30-51 wt. % starch. In certain embodiments, the starch is corn starch or potato starch. In certain embodiments, the anticaking agent comprises 25-30.2 wt. % sugarcane fiber. In certain embodiments, the anticaking agent comprises 9.7-20 wt. % dextrose and 0.04-0.05 wt. % glucose oxidase. In certain embodiments, the anticaking agent comprises 0.06-0.08 wt. % natamycin. In certain embodiments, the anticaking agent comprises 10 wt. % potassium sorbate. In certain embodiments, the anticaking agent comprises 0.02 wt. % silicon dioxide. In certain embodiments, the anticaking agent comprises 0.01-5 wt. % mineral oil, such as 0.04-0.5 wt. % mineral oil.

In certain embodiments, the anticaking agent is chosen from Examples 1 to 9 from Table 1 or Examples 10 to 18 from Table 2. In certain embodiments, the anticaking agent is chosen from Examples 19-23 from Table 4, from Examples 24-30 from Table 6, 3 from Examples 31-34 from Table 8, from Examples 35-40 from Table 10, from Examples 45 and 46 from Table 13, or from Examples 47-51 from Table 17.

The present disclosure further provides an anticaking agent for cheese, comprising 40-70 wt. % one or more dairy ingredients chosen from milk permeate powder, whey permeate powder, dried whey, and combinations thereof; and 30-60 wt. % one or more non-dairy ingredients chosen from cellulose, sugarcane fiber, calcium sulfate, calcium phosphate, dicalcium phosphate, silicon dioxide, starch, dextrose monohydrate, glucose oxidase, natamycin, potassium sorbate, mineral oil, high oleic sunflower oil, and combinations thereof; wherein the anticaking agent can be applied to divided cheese to prevent caking.

The present disclosure provides an anticaking agent for cheese, comprising 20-70 wt. % one or more dairy ingredients; and 30-80 wt. % one or more non-dairy ingredients; wherein the anticaking agent when applied to a divided cheese has low visibility on the divided cheese, prevents caking of the divided cheese, and browns similarly to divided cheese without the anticaking agent when baked in an impinger oven at between 425° F. and 450° F. for 5 minutes.

The present disclosure provides an anticaking agent for cheese, comprising 20-70 wt. % one or more dairy ingredients chosen from milk permeate powder, whey permeate powder, deproteinized whey, and combinations thereof; and 30-80 wt. % one or more non-dairy ingredients chosen from sugarcane fiber, calcium sulfate, calcium phosphate, silicon dioxide, starch, dextrose monohydrate, glucose oxidase, natamycin, mineral oil, high oleic sunflower oil, and combinations thereof; wherein the anticaking agent when applied to a divided cheese has low visibility on the divided cheese, prevents caking of the divided cheese, and browns similarly to divided cheese without the anticaking agent when baked in an impinger oven at between 425° F. and 450° F. for 5 minutes.

The present disclosure provides an anticaking agent for cheese, chosen from a first composition comprising 20.5 wt. % whey permeate powder, 79 wt. % potato starch, 0.1 wt. % silicon dioxide, and 0.4 wt. % mineral oil; a second composition comprising 48 wt. % whey permeate powder, 2 wt. % calcium sulfate, 48 wt. % corn starch, and 2 wt. % tricalcium phosphate; a third composition comprising 68.8 wt. % whey permeate powder, 30.1 wt. % sugarcane fiber, 0.12 wt. % silicon dioxide, and 1 wt. % mineral oil; a fourth composition comprising 28.5 wt. % whey permeate powder, 2 wt. % calcium sulfate, 67.5 wt. % potato starch, 0.35 wt. % silicon dioxide, and 1.75 wt. % mineral oil; or a fifth composition comprising 21.9 wt. % whey permeate powder, 2 wt. % calcium sulfate, 60 wt. % potato starch, 4.6 wt. % high oleic sunflower oil, 10 wt. % dextrose, 0.05 wt. % glucose oxidase, 0.04 wt. % natamycin, and 1.5 wt. % silicon dioxide.

The present disclosure also provides a food product comprising: divided cheese comprising a plurality of individual cheese particles; and an anticaking agent disclosed herein dispersed on the individual cheese particles in an amount sufficient to inhibit caking of the individual cheese particles. In certain embodiments, the anticaking agent is applied at up to 6 wt. % of the product.

Also provided is a method of treating divided cheese for anticaking, comprising: dispersing an anticaking agent described herein over a divided cheese.

Also provided is a method of treating divided cheese for anticaking, comprising: providing divided cheese; dispersing an anticaking agent described herein over the divided cheese; wherein the anticaking agent provides a means for controlling the cheese browning during cooking. In certain embodiments, the anticaking agent is applied at up to 6 wt. % of the food product.

DETAILED DESCRIPTION

Figure 1:
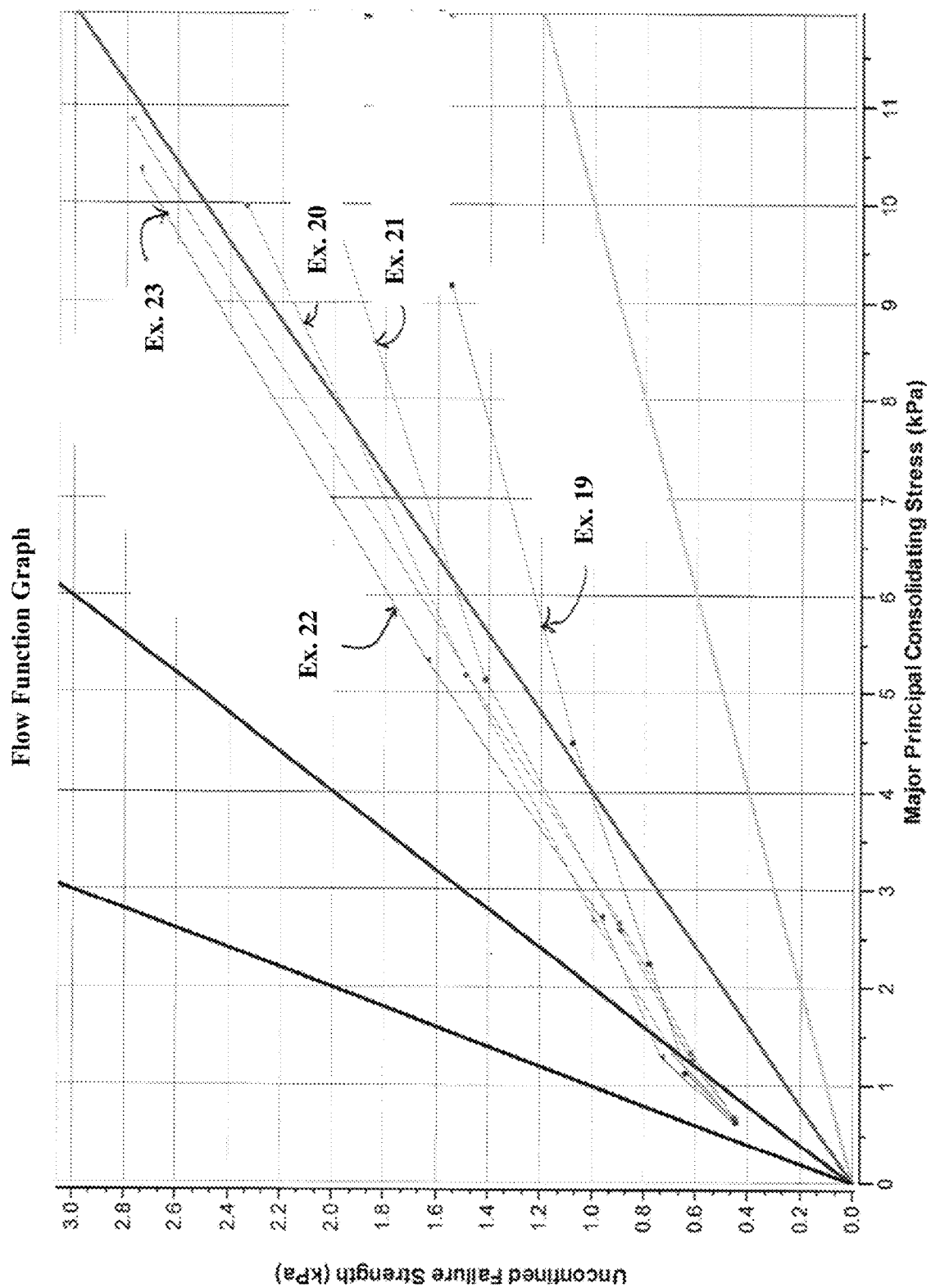
FIG. 1 depicts a flow function graph of unconfirmed failure strength (kPa) to major principal consolidating stress (kPa) for examples 19-23 in experimental Example 2. The reference lines radiating from the origin are, from top to bottom, very cohesive, cohesive, easy flowing, and free-flowing.

To aid understanding of the disclosure, several terms and abbreviations as used herein are defined below as follows:

The articles "a," "an," "the," and "said" are intended to mean that there are one or more of the elements. The terms "comprising," "including," and "having" are intended to be inclusive and mean that there may be additional elements other than the listed elements.

The term "and/or" when used in a list of two or more items means that any one of the listed items can be employed by itself or in combination with any one or more of the listed items. For example, the expression "A and/or B" is intended to mean either or both of A and B, i.e., A alone, B alone, or A and B in combination. The expression "A, B, and/or C" is intended to mean A alone, B alone, C alone, A and B in combination, A and C in combination, B and C in combination, or A, B, and C in combination.

Anticaking agent in the food industry, especially in the dairy and cheese industry, is defined as any safe and suitable food ingredient which, when added, should prevent lumping of shredded, diced, or chunked dairy product, such as cheese, during storage at room temperature or refrigerator or freezer. Such a dairy product with an anticaking agent in it should be easy to handle at the time of applying on the final food product. Some cheeses, after they are chunked and if the anticaking agent is not used, will cake and are very difficult to handle. This is a serious problem, especially with high moisture and high-fat cheeses. Several anticaking agents are commercially available, such as cellulose, microcrystalline cellulose, and starch.

The dairy-based anticaking agents herein have several advantages over prior anticaking agents. When an anticaking agent described herein is applied to a divided cheese, it has low visibility on the divided cheese, becoming practically invisible within a few moments, even after application at 4 wt. % or greater loading. These anticaking agents also prevented caking of the divided cheese, even after storage for up to about two weeks.

The dairy-based anticaking agents herein also had exceptional browning qualities. Whey and whey powder typically contains 61-75 wt. % lactose. Lactose is a disaccharide consisting of galactose and glucose. Lactose is a reducing sugar and in the presence of amino acids and heat undergoes Maillard browning. Even reduced lactose whey products comprising 50 wt. % lactose is expected to significantly accelerate the browning process. Surprisingly, the anticaking agents herein browned similarly to divided cheese without the anticaking agent when baked in an impinger oven at between 425° F. and 450° F. for 5 minutes, despite containing a relatively high amount of lactose because of the dairy ingredient. Thus, the anticaking agents described herein are suitable for institutional and pizza cheese type applications subjected to high heat conditions, such as those tested under the impinger oven conditions employed herein.

The term "cheese" as used herein refers broadly to all types of cheeses, including, for example, cheeses as defined under the CODEX general Standard for Cheese and as defined under various state and national regulatory bodies. Exemplary classes of cheeses include, but are not limited to, firm/semi-hard cheeses, soft cheeses, analog cheeses, blended cheeses, and pasta filata cheeses, among other types of cheeses.

The present disclosure provides an anticaking agent for cheese, comprising 20-85 wt. % one or more dairy ingredients, and 15-80 wt. % one or more non-dairy ingredients, wherein the anticaking agent can be applied to divided cheese to prevent caking. In certain embodiments, the anticaking agent for cheese comprises 40-70 wt. % one or more dairy ingredients; and 30-60 wt. % one or more non-dairy ingredients, wherein the anticaking agent can be applied to divided cheese to prevent caking.

The term "dairy ingredient" as used herein refers to products or byproducts obtained from processing milk. In certain embodiments, the dairy ingredients consist essentially of one or more constituents of milk, namely, milk proteins, milk fat, lactose, and/or milk minerals. In various embodiments, the dairy ingredient is chosen from milk permeate powder, whey permeate powder, cheese whey powder, sweet dairy whey powder, non-hygroscopic dried whey, acid whey powder, whey protein concentrate, whey protein isolate, milk protein concentrate, milk protein isolate, whey cream, whey protein-lipid concentrate, rennet casein, calcium caseinate, sodium caseinate, milk minerals, milk calcium, milk calcium phosphate, lactose, skim milk powder, non-fat dry milk, acid casein, and combinations thereof. For example, the one or more dairy ingredients may be chosen from milk permeate powder, whey permeate powder, dried whey, and combinations thereof. In certain embodiments, the dairy ingredient is dairy product solids. In certain embodiments, the dairy ingredient is dairy product solids (DPS), which consists essentially of milk permeate powder, whey permeate powder, deproteinized whey, and combinations thereof.

In certain embodiments, the anticaking agent comprises 43-75 wt. % milk permeate powder, such as between 46 wt. % and 70 wt. % milk permeate powder, for example, between 43 wt. % and 45 wt. %, between 45 wt. % and 50 wt. %, between 50 wt. % and 55 wt. %, between 55 wt. % and 60 wt. %, between 60 wt. % and 65 wt. %, between 65 wt. % and 70 wt. %, or between 70 wt. % and 75 wt. % milk permeate powder. In certain embodiments, the anticaking agent comprises more than 43 wt. % milk permeate powder, such as more than 46 wt. % milk permeate powder. In certain embodiments, the anticaking agent comprises less than 75 wt. % milk permeate powder, such as less than 70 wt. %.

In certain embodiments, the anticaking agent comprises 20-70 wt. % whey permeate powder, such as between 20 wt. % and 25 wt. %, between 25 wt. % and 30 wt. %, between 30 wt. % and 35 wt. %, between 35 wt. % and 40 wt. %, between 40 wt. % and 45 wt. %, between 45 wt. % and 50 wt. %, between 50 wt. % and 55 wt. %, between 55 wt. % and 60 wt. %, between 60 wt. % and 65 wt. %, or between 65 wt. % and 70 wt. % whey permeate powder. In certain embodiments, the anticaking agent comprises 20.5 wt. %. 21.9 wt. %, 25 wt. %, 28.5 wt. %, 48 wt. %, 60 wt. %, 68.8 wt. %, or 69.8 wt. % whey permeate powder. In certain embodiments, the anticaking agent comprises 25 wt. %, 60 wt. %, or 69.8 wt. % whey permeate powder. In certain embodiments, the anticaking agent comprises more than 20 wt. % whey permeate powder. In certain embodiments, the anticaking agent comprises more than 60 wt. % whey permeate powder. In certain embodiments, the anticaking agent comprises less than 70 wt. % whey permeate powder.

In certain embodiments, the anticaking agent comprises 60-65 wt. % dried whey, such as 60 wt. %, 61 wt. %, 62 wt. %, 63 wt. %, 64 wt. %, or 65 wt. % dried whey. In certain embodiments, the anticaking agent comprises more than 60 wt. % dried whey. In certain embodiments, the anticaking agent comprises less than 65 wt. % dried whey.

In certain embodiments, the anticaking agent comprises 10 wt. % milk minerals.

The term "non-dairy ingredient" as used herein refers to ingredients essentially free from milk components. In various embodiments, the non-dairy ingredient is chosen from cellulose, modified cellulose, calcium sulfate, calcium phosphate, dicalcium phosphate, silicon dioxide, native starch, modified starch, bentonite, and combinations thereof. In certain embodiments, in the one or more non-dairy ingredient is chosen from cellulose, sugarcane fiber, calcium sulfate, calcium phosphate, dicalcium phosphate, silicon dioxide, starch, dextrose monohydrate, glucose oxidase, natamycin, potassium sorbate, mineral oil, high oleic sunflower oil, and combinations thereof.

In certain embodiments, the anticaking agent comprises 30-80 wt. % one or more non-dairy ingredients, such as between 30 wt. % and 35 wt. %, between 35 wt. % and 40 wt. %, between 40 wt. % and 45 wt. %, between 45 wt. % and 50 wt. %, between 50 wt. % and 55 wt. %, between 55 wt. % and 60 wt. %, between 60 wt. % and 65 wt. %, between 65 wt. % and 70 wt. %, between 70 wt. % and 75 wt. %, or between 75 wt. % and 80 wt. % one or more non-dairy ingredients. In certain embodiments, the anticaking agent comprises more than 30 wt. % one or more non-dairy ingredients. In certain embodiments, the anticaking agent comprises less than 60 wt. % one or more non-dairy ingredients.

In certain embodiments, the anticaking agent comprises 1-15 wt. % calcium sulfate, such as 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. % calcium sulfate. In certain embodiments, the anticaking agent comprises 10 wt. % calcium sulfate. In certain embodiments, the anticaking agent comprises 2 wt. % calcium sulfate. In certain embodiments, the anticaking agent comprises more than 2 wt. % calcium sulfate. In certain embodiments, the anticaking agent comprises more than 5 wt. % calcium sulfate. In certain embodiments, the anticaking agent comprises less than 15 wt. % calcium sulfate.

In certain embodiments, the anticaking agent comprises 1-15 wt. % calcium phosphate, such as 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. % calcium phosphate. In certain embodiments, the anticaking agent comprises 10 wt. % calcium phosphate. In certain embodiments, the anticaking agent comprises 2 wt. % calcium phosphate. In certain embodiments, the anticaking agent comprises more than 2 wt. % calcium phosphate. In certain embodiments, the anticaking agent comprises more than 5 wt. % calcium phosphate. In certain embodiments, the anticaking agent comprises less than 15 wt. % calcium phosphate. The calcium phosphate may be monocalcium phosphate ($Ca(H_2PO_4)_2$), dicalcium phosphate ($Ca_2(HPO_4)_2$), or tricalcium phosphate ($Ca_3(PO_4)_2$), or combinations thereof.

In certain embodiments, the anticaking agent comprises 1-15 wt. % tricalcium phosphate, such as 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or 15 wt. % tricalcium phosphate. In certain embodiments, the anticaking agent comprises 10 wt. % tricalcium phosphate. In certain embodiments, the anticaking agent comprises 2 wt. % tricalcium phosphate. In certain embodiments, the anticaking agent comprises more than 2 wt. % tricalcium phosphate. In certain embodiments, the anticaking agent comprises more than 5 wt. % tricalcium phosphate. In certain embodiments, the anticaking agent comprises less than 15 wt. % tricalcium phosphate.

In certain embodiments, the anticaking agent comprises 9.5-40 wt. % cellulose, such as between 9.5 wt. % and 10 wt. %, between 10 wt. % and 15 wt. %, between 15 wt. % and 20 wt. %, between 20 wt. % and 25 wt. %, between 25 wt. % and 30 wt. %, between 30 wt. % and 35 wt. %, or between 35 wt. % and 40 wt. % cellulose. In certain embodiments, the anticaking agent comprises more than 9.5 wt. % cellulose. In certain embodiments, the anticaking agent comprises less than 40 wt. % cellulose.

In certain embodiments, the anticaking agent comprises 48-80 wt. % starch, such as between 48 wt. % and 50 wt. %, between 50 wt. % and 55 wt. %, between 55 wt. % and 60 wt. %, between 60 wt. % and 65 wt. %, between 65 wt. % and 70 wt. %, between 70 wt. % and 75 wt. %, or between 75 wt. % and 80 wt. % starch. In certain embodiments, the anticaking agent comprises 30-51 wt. % starch, such as between 30 wt. % and 35 wt. %, between 35 wt. % and 40 wt. %, between 40 wt. % and 45 wt. %, between 45 wt. % and 50 wt. %, or between 50 wt. % and 51 wt. % starch. In certain embodiments, the anticaking agent comprises more than 30 wt. % starch. In certain embodiments, the anticaking agent comprises less than 51 wt. % starch.

As used herein, the term "starch" refers to any material comprising the complex polysaccharide carbohydrates of plants, comprising amylose and amylopectin with the formula $(C_6H_{10}O_5)_x$, wherein x can be any number. In various embodiments, the starches used herein are native starches and/or are starches that have been modified by cross-linking, derivatization, substitution, or other processes that involve chemical treatment to impart desired functional properties. In certain embodiments, the modified starches are cross-linked starches, which may comprise a native starch that has been cross-linked via any suitable cross-linking technique known in the art or otherwise found to be suitable in conjunction with the disclosed compositions. In a specific embodiment, the modified starch is distarch phosphate with and without substitution using any type of native starch or acid or enzyme-modified starches with or without cross-linking and/or substitution.

A "resistant starch" is the sum of starch and products of starch degradation not absorbed in the small intestine of a healthy human being. Resistant starch occurs naturally in foods but may also be added to foods as isolated or manufactured types of resistant starch.

Resistant starch has been categorized into four types:
RS1—Physically inaccessible or undigestible resistant starch, such as that found in seeds or legumes and unprocessed whole grains;
RS2—Resistant starch is inaccessible to enzymes due to starch conformation, as in high amylose corn starch;
RS3—Resistant starch that is formed when starch-containing foods are cooked and cooled, such as pasta. Occurs due to retrogradation, which refers to the collective processes of dissolved starch becoming less soluble after being heated and dissolved in water and then cooled; and
RS4—Starches that have been chemically modified to resist digestion.

Some resistant starches (RS1, RS2, and RS3) are fermented by the large intestinal microbiota, conferring benefits to human health by producing short-chain fatty acids, increasing bacterial mass, and producing butyrate-producing bacteria. Starches with high amylose content generally have increased resistant starch.

Suitable examples of native starch include, but are not limited to, cereal starch, potato starch, and legume starch, such as Irish potato starch, sweet potato starch, tapioca starch, cornstarch, rice starch, wheat starch, sorghum starch, and the like; typical examples of starch derivatives are dextrin, cross-linked starch and the like. Regardless of the starch-containing material from which the starch and its derivatives are derived, and the form of the starch (e.g., a straight-chain starch or a branched starch), D-glucose bonded with α-1,4-glucoside, or α-1,6-glucoside linkage constitutes the fundamental structure, and thus starch and its derivatives either those described above or those not mentioned here may be applicable.

In various embodiments, the starch is chosen from corn starch, potato starch, wheat starch, rice starch, sago starch, tapioca starch, and sorghum starch. In certain embodiments, the starch is corn starch. In certain embodiments, the starch is potato starch.

In certain embodiments, the anticaking agent comprises 25-30.2 wt. % sugarcane fiber, such as 25 wt. %, 26 wt. %, 27 wt. %, 28 wt. %, 29 wt. %, 30 wt. %, 30.1 wt. %, or 30.2 wt. % sugarcane fiber. In certain embodiments, the anticaking agent comprises more than 25 wt. % sugarcane fiber. In certain embodiments, the anticaking agent comprises less than 30.2 wt. % sugarcane fiber.

"Sugarcane fiber" or "bagasse" is the fibrous matter that remains after sugarcane or is crushed to extract its juice. Typical washed and dried sugarcane fiber comprises 45-55% cellulose, 20-25% hemicellulose, 18-24% lignin, 1-4% ash, and less than 1% waxes. Sugarcane fiber begins as a heterogeneous material containing about 30-40% "pith" fiber, which is derived from the core of the plant and is mainly parenchyma material, and "bast," "rind," or "stem" fiber, which comprises the balance and is largely derived from sclerenchyma material. Sugarcane fiber is a soluble fiber.

When present, the combination of dextrose and glucose oxidase enzyme is an oxygen scavenger system that can be added to any anticaking agent described herein, for example, to preserve freshness. In certain embodiments, the anticaking agent comprises 9.7-20 wt. % dextrose and 0.04-0.05 wt. % glucose oxidase, such at 9.7 wt. %, 10 wt. %, 11 wt. %, 12 wt. %, 13 wt. %, 14 wt. %, 15 wt. %, 16 wt. %, 17 wt. %, 18 wt. %, 19 wt. %, or 20 wt. % dextrose in combination with 0.04 wt. % or 0.05 wt. % glucose oxidase. The dextrose may be in a hydrated crystalline form, such as dextrose monohydrate. In certain embodiments, the anticaking agent comprises more than 9.7 wt. % dextrose. In certain embodiments, the anticaking agent comprises less than 20 wt. % dextrose. In certain embodiments, the anticaking agent comprises more than 0.04 wt. % glucose oxidase. In certain embodiments, the anticaking agent comprises less than 0.05 wt. % glucose oxidase.

In certain embodiments, the anticaking agent comprises an antimycotic, such as natamycin. In certain embodiments, the anticaking agent comprises 0.04-0.08 wt. % natamycin, such as 0.04 wt. %, 0.05 wt. %, 0.06 wt. %, 0.07 wt. %, or 0.08 wt. % natamycin. In certain embodiments, the anticaking agent comprises more than 0.04 wt. % natamycin. In certain embodiments, the anticaking agent comprises more than 0.06 wt. % natamycin. In certain embodiments, the anticaking agent comprises less than 0.08 wt. % natamycin.

In certain embodiments, the anticaking agent comprises 10 wt. % potassium sorbate. In certain embodiments, the anticaking agent comprises 0.01-1.5 wt. % silicon dioxide (silica), such as between 0.01 wt. % and 0.1 wt. %, between 0.1 wt. % and 0.2 wt. %, between 0.2 wt. % and 0.3 wt. %, between 0.3 wt. % and 0.4 wt. %, between 0.4 wt. % and 0.5 wt. %, between 0.5 wt. % and 0.6 wt. %, between 0.6 wt. % and 0.7 wt. %, between 0.7 wt. % and 0.8 wt. %, between 0.8 wt. % and 0.9 wt. %, between 0.9 wt. % and 1.0 wt. %, between 1.0 wt. % and 1.1 wt. %, between 1.1 wt. % and 1.2 wt. %, between 1.2 wt. % and 1.3 wt. %, between 1.3 wt. % and 1.4 wt. %, or between 1.4 wt. % and 1.5 wt. % silicon dioxide. In certain embodiments, the anticaking agent comprises 0.02 wt. % silicon dioxide. In certain embodiments, the anticaking agent comprises more than 0.1 wt. % silicon dioxide. In certain embodiments, the anticaking agent comprises less than 1.5 wt. % silicon dioxide. The silicon dioxide (silica) may be Sipernat™ by Evonik, such as Sipernat™ 22LS or Sipernat™ 50 S. Sipernat™ 22LS has spherical particles, low fines content and high oil absorption (DBP) supplied by Evonik Industries. Sipernat™ combines high absorption capacity for liquids with high bulk density and very good flow properties.

In certain embodiments, the anticaking agent comprises 0.01-5 wt. % mineral oil, such as between 0.01 wt. % and 0.05 wt. %, between 0.05 wt. % and 0.1 wt. %, between 0.1 wt. % and 0.15 wt. %, between 0.15 wt. % and 0.2 wt. %, between 0.2 wt. % and 0.25 wt. %, between 0.25 wt. % and 0.3 wt. %, between 0.3 wt. % and 0.35 wt. %, between 0.35 wt. % and 0.4 wt. %, between 0.4 wt. % and 0.45 wt. %, between 0.45 wt. % and 0.5 wt. %, between 0.5 wt. % and 0.75 wt. %, between 0.75 wt. % and 1.0 wt. %, between 1.0 wt. % and 1.25 wt. %, between 1.25 wt. % and 1.5 wt. %, between 1.5 wt. % and 1.75 wt. %, between 1.75 wt. % and 2.0 wt. %, between 2.0 wt. % and 2.25 wt. %, between 2.25 wt. % and 2.5 wt. %, between 2.5 wt. % and 2.75 wt. %, between 2.75 wt. % and 3.0 wt. %, between 3.0 wt. % and 3.25 wt. %, between 3.25 wt. % and 3.5 wt. %, between 3.5 wt. % and 3.75 wt. %, between 3.75 wt. % and 4.0 wt. %, between 4.0 wt. % and 4.25 wt. %, between 4.25 wt. % and 4.5 wt. %, between 4.5 wt. % and 4.75 wt. %, or between 4.75 wt. % and 5.0 wt. % mineral oil. In certain embodiments, the anticaking agent comprises 0.04-0.5 wt. % mineral oil, such as 0.04 wt. %, between 0.05 wt. % and 0.1 wt. %, between 0.1 wt. % and 0.15 wt. %, between 0.15 wt. % and 0.2 wt. %, between 0.2 wt. % and 0.25 wt. %, between 0.25 wt. % and 0.3 wt. %, between 0.3 wt. % and 0.35 wt. %, between 0.35 wt. % and 0.4 wt. %, between 0.4 wt. % and 0.45 wt. %, or between 0.45 wt. % and 0.5 wt. % mineral oil. In certain embodiments, the anticaking agent comprises more than 0.01 wt. % mineral oil. In certain embodiments, the anticaking agent comprises more than 0.05 wt. % mineral oil. In certain embodiments, the anticaking agent comprises less than 5 wt. % mineral oil. In certain embodiments, the anticaking agent comprises less than 0.5 wt. % mineral oil.

In certain embodiments, the anticaking agent comprises 1.0-5.0 wt. % high-oleic sunflower oil (HOSFO), such as between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, between 1.0 wt. % and 1.5 wt. %, or between 1.0 wt. % and 1.5 wt. % high oleic sunflower oil. In certain embodiments, the anticaking agent comprises 4.6 wt. % high-oleic sunflower oil. In certain embodiments, the anticaking agent comprises more than 1.0 wt. % high-oleic sunflower oil. In certain embodiments, the anticaking agent comprises less than 5.0 wt. % high-oleic sunflower oil.

In certain embodiments, the anticaking agent is essentially free of clays, such as bentonite. In certain embodiments, the anticaking agent is essentially free of metal carbonates, such as calcium carbonate. In certain embodiments, the anticaking agent is essentially free of silicon dioxide. In certain embodiments, the anticaking agent is essentially free of cellulose. In certain embodiments, the anticaking agent is essentially free of cellulose and metal carbonates.

Food Product

The present disclosure also provides a food product comprising: divided cheese comprising a plurality of individual cheese particles; and an anticaking agent disclosed herein dispersed on the individual cheese particles in an amount sufficient to inhibit caking of the individual cheese particles. In certain embodiments, the anticaking agent is applied at up to 6 wt. % of the product.

In various embodiments, the anticaking agent is applied to divided cheese at between 0.1 wt. % and 10 wt. %. In various embodiments, the anticaking agent is applied to divided cheese at about 1 wt. %. In various embodiments, the anticaking agent is applied to divided cheese at about 2 wt. %. In various embodiments, the anticaking agent is applied to divided cheese at about 3 wt. %. In various embodiments, the anticaking agent is applied to divided cheese at about 4 wt. %. In various embodiments, the anticaking agent is applied to divided cheese at about 5 wt. %. In various embodiments, the anticaking agent is applied to divided cheese at about 6 wt. %. In various embodiments, the anticaking agent is applied to divided cheese at about 7 wt. %.

Methods

In various embodiments, there is provided a method of treating divided cheese for anticaking, comprising: providing divided cheese; dispersing an anticaking agent described herein over the divided cheese; wherein the anticaking agent provides a means for controlling the cheese browning during cooking. In certain embodiments, the anticaking agent is applied at up to 6 wt. % of the food product.

After reading this description, it will become apparent to one skilled in the art how to implement the disclosure in various alternative embodiments and alternative applications. However, although various embodiments of the present disclosure will be described herein, it is understood that these embodiments are presented by way of example only and not limitation. As such, this detailed description of various alternative embodiments should not be construed to limit the scope or breadth of the present disclosure as set forth in the appended claims.

EXAMPLES

Example 1—Compositions

Tables 1 and 2 illustrate formulations for anticaking compositions that have been prepared and tested.

TABLE 1

| Ingredient | Example (wt. %) | | | | | | | | |
|---|---|---|---|---|---|---|---|---|---|
| | 1 | 2 | 3 | 4 | 5 | 6 | 7 | 8 | 9 |
| Milk permeate powder | 60 | — | 70 | 55.8 | — | — | 60 | — | — |
| Whey permeate powder | — | 60 | — | — | 35 | 60 | — | — | 25 |

TABLE 1-continued

| Ingredient | Example (wt. %) | | | | | | | | |
|---|---|---|---|---|---|---|---|---|---|
| | 1 | 2 | 3 | 4 | 5 | 6 | 7 | 8 | 9 |
| Dried whey | — | — | — | — | — | — | — | 60 | — |
| Milk minerals | — | — | — | — | 20 | — | — | — | — |
| Lactose | — | — | — | — | 35 | — | — | — | — |
| Casein | — | — | — | — | 10 | — | — | — | — |
| Calcium sulfate | 10 | 10 | — | — | — | — | — | 10 | — |
| Cellulose | 30 | 30 | 30 | — | — | 40 | 10 | 30 | 20 |
| Potato starch | — | — | — | 43.6 | — | — | — | — | — |
| Corn starch | — | — | — | — | — | — | 30 | — | 55 |
| Natamycin | — | — | — | 0.08 | — | — | — | — | — |
| Mineral oil | — | — | — | 0.5 | — | — | — | — | — |
| Total | 100.0 | 100.0 | 100.0 | 100.0 | 100.0 | 100.0 | 100.0 | 100.0 | 100.0 |

TABLE 2

| Ingredient | Example (wt. %) | | | | | | | | |
|---|---|---|---|---|---|---|---|---|---|
| | 10 | 11 | 12 | 13 | 14 | 15 | 16 | 17 | 18 |
| Milk permeate powder | 50.5 | 59.7 | 49.4 | 51.2 | 49.2 | — | 45.9 | 50.2 | — |
| Whey permeate powder | — | — | — | — | — | — | — | — | 69.7 |
| Dried whey | — | — | — | — | — | 64.6 | — | — | — |
| Calcium sulfate | 10.5 | — | — | — | — | — | — | — | — |
| Cellulose | 29.2 | — | — | 9.5 | — | — | — | — | — |
| Sugarcane fiber | — | 30.1 | — | — | — | 25.1 | — | — | 30.2 |
| Potato starch | — | — | 50.1 | 38.7 | 30.0 | — | — | — | — |
| Corn starch | — | — | — | — | — | — | 43.9 | 49.4 | — |
| Dextrose monohydrate | 9.7 | 10.1 | — | — | 20.0 | — | 10.0 | — | — |
| Glucose oxidase | 0.04 | 0.04 | — | — | 0.05 | — | 0.05 | — | — |
| Natamycin | 0.08 | 0.07 | 0.08 | 0.08 | 0.06 | — | 0.08 | 0.08 | — |
| Potassium sorbate | — | — | — | — | — | 10.0 | — | — | — |
| Sipernat ™ 22LS | — | — | — | 0.02 | — | — | — | — | — |
| Mineral oil | 0.04 | 0.05 | 0.40 | 0.50 | 0.50 | 0.31 | 0.12 | 0.30 | 0.06 |
| Total | 100.0 | 100.0 | 100.0 | 100.0 | 100.0 | 100.0 | 100.0 | 100.0 | 100.0 |

Sipernat ™ 22LS is a food-grade silicon dioxide (silica).

Anticaking Properties

The properties of the anticaking compositions were studied via a series of iterative pizza cheese bake tests. Each bake test contained a control sample—cellulose added to shredded cheese at 1.5 wt. %, and experimental samples—anticaking blends at 4.0 wt. %. Results from each test were used to modify ingredient blends for subsequent tests. Visual examination of anticaking effectiveness was determined 1-2 days following addition to the shredded cheese. Anticaking blends that resulted in pizza cheese shreds sticking or lumping may be excluded from the bake tests. The treated cheeses were evaluated in tests using the following guidelines shown in Table 3.

Cheese was prepared with the anticaking compositions as follows:

1. Shred cheese using the Kitchen Aid™ stand mixer (speed setting 2) with the attached coarse shredder. Target average shred size: length—45 mm, width—3-4 mm.
2. Weigh desired quantity of cheese.
3. Place cheese into a 60-ounce plastic container and add an anticaking agent, either 1.5 wt. % cellulose powder or 4 wt. % experimental anticaking blend (pre-mixed).
4. Put a lid on the container and shake the container by hand until the anticaking agent is incorporated into the shredded cheese (approximately 15 seconds).
5. Hold the shredded cheese with anticaking ingredients in the 60-ounce containers at 40° F. for 20-60 hours.
6. For pizza cheese bake evaluation, follow the Pizza Preparation and Evaluation procedure. Pizza was prepared and evaluated using the following methods:
1. Preheat Impinger Oven to 450° F. Set the bake time for 4 minutes and 30 seconds.
2. Remove up to 4 sets of shredded cheese with an anticaking ingredient from a cooler and up to 4 pizza crusts from a freezer. Place on the counter at room temperature.

3. Place 130 g pizza sauce on a 12" pizza crust and spread uniformly to within about 1" of the edge. Uniformly distribute 200 grams of cheese with an anticaking agent onto the pizza.
4. Place the pizza on a round pizza screen. Then, place the screen on the conveyor belt and bake the pizza. Do not push pizza into the oven; allow the belt to pull the pizza into the Impinger Oven.
5. While cooling, evaluate pizza for browning, oiling off, and shred using the Pizza Cheese Evaluation Guidelines (Table 3).
6. After 2 minutes, test the string by inserting a fork under the cheese and pulling in an upward motion, and noting the height with a ruler at which the cheese breaks.
7. Evaluate flavor, mouthfeel, and appearance at 10 minutes.
8. Evaluate pizza cheese appearance after 30 minutes and 60 minutes. Record any observations.

TABLE 3

Pizza Cheese Evaluation Guidelines

1 Browning
  10 No or very few small brown spots
  8 Small brown spots about the size of a dime (1.8 cm diameter)
  4 50% brown spots on the surface-some large, some small
  1 95-100% covered with large (quarter-sized, 2.4 cm diameter) brown spots on the surface
2 Oiling
  10 Slight oil sheen visible
  8 Very few pools present, smaller than a dime (1.8 cm)
  4 Slight pools present, larger than a dime (1.8 cm)
  1 Many large pools present
4 Shred
  10 Confluent-melting all together
  8 Outline of shred still evident-10%
  5 Outline of shreds still evident-30%
  1 Little to no sign of melting
5 String-a 2 minutes until breakage
  Noted as the actual length of string when lifted with fork.
6 Flavor
  10 Good flavor-no off tastes
  5 Some off notes on flavor
  1 Unacceptable flavor
7 Mouthfeel
  10 Smooth tender body
  8 Mostly soft or slightly chewy, but smooth
  4 Moderately tough or chewy, mealy, grainy plastic mouthfeel
  1 Extremely tough, excessive graininess, sandiness and/or chewiness
8 Appearance at 10 minutes
  10 White or slight off-white
  8 Slightly translucent
  4 Moderately translucent
  1 Very translucent Example 2—Two-Component Anticake Formulations This study compared the performance of Ex. 19 (dairy product solids/sugarcane) with that of formulations wherein dairy product solids (DPS) was replaced with sweet whey (Ex. 20-23, whey/sugarcane). In Ex. 20, sweet whey was substituted for DPS in the 70:30 DPS/sugarcane formulation (1% mineral oil and 0.12% Sipernat™ 50 S). In Ex. 21, the 70:30 whey/sugarcane formulation had an increased silicon dioxide concentration (1% mineral oil and 0.18% Sipernat™ 50 S). In Example 22, the whey concentration was reduced to a 60:40 whey/sugarcane ratio (1% mineral oil and 0.18% Sipernat™ 20 S). In Example 23, the whey/sugarcane ratio was partly increased to 65:35 plus more mineral oil and silicon dioxide (1.5% mineral oil and 0.21% Sipernat™ 50 S).

TABLE 4

| Ingredient/Property | Example (wt. %) | | | | |
|---|---|---|---|---|---|
| | 19 | 20 | 21 | 22 | 23 |
| Dairy product solids | 68.7 | — | — | — | — |
| Sweet whey | — | 68.7 | 68.7 | 58.7 | 63.2 |
| SCF SF601-100 (JRS) | 30.1 | 30.1 | 30.0 | 40.0 | 35.0 |
| Natamycin | 0.08 | 0.08 | 0.08 | 0.08 | 0.08 |
| Mineral oil | 1.00 | 1.00 | 1.00 | 1.00 | 1.50 |
| Silicon Dioxide | 0.12 | 0.12 | 0.18 | 0.18 | 0.21 |
| Total | 100.0 | 100.0 | 100.0 | 100.0 | 100.0 |
| Moisture, % | 5.62 | 6.06 | 5.88 | 5.78 | 6.04 |
| Water activity | 0.2656 | 0.2680 | 0.2660 | 0.2723 | 0.2666 |
| Drop dusting* | 4.13 | 4.25 | 4.13 | 4.25 | 4.37 |
| Drop flow* | 3.5 | 2.75 | 2.9 | 2.75 | 2.25 |
| Powder flow tester curve slope | 0.12 | 0.20 | 0.17 | 0.22 | 0.23 |
| Crit. rat-holing (dia., mm) | 689 | 1126 | 991 | 1273 | 1292 |
| Bulk density packed, g/mL | 0.52 | 0.48 | 0.49 | 0.42 | 0.43 |
| Mozz. shred separation* | 4.9 | 4.5 | 4.6 | 4.6 | 4.6 |
| Mozz. Appearance* | 3.8 | 4.0 | 3.9 | 3.8 | 4.0 |
| Cheddar shred separation* | 4.8 | 3.9 | 4.2 | 4.7 | 4.4 |
| Cheddar appearance* | 3.4 | 4.1 | 3.9 | 3.5 | 3.7 |
| Browning at 425° F./5 min (Range)* | 3.25 | 3.7 (4.0/3.5) | 4.0 (3.7/4.2) | 3.75 | 3.5 |
| Impinger Exit temp. | 184° F. | 185° F. | 185° F. | 185° F. | 185° F. |

*Rated on a 5-point subjective scale.
DPS = Dairy product solids.
SCF SF601-100 is a sugarcane fiber supplied by J. Rettenmaier & Söhne GmbH + Co KG ("JRS").
Sipernat ™ 50 S is a food-grade silicon dioxide.

TABLE 5

Browning Test repeated-Single Samples (415° F./5 min)

| Property | 2% Cellulose | Example at 4% Loading | | | | |
|---|---|---|---|---|---|---|
| | | 19 | 20 | 21 | 22 | 23 |
| Exit temp, (range) ° F. | 176 (167-185) | 179 (167-188) | 174 (161-185) | 176 (167-181) | 176 (168-186) | 176 (167-186) |
| Browning* | 5.0/4.5 | 4.5/4.0 | 4.75/4.0 | 4.75/4.25 | 4.9/4.37 | 4.75/4.0 |
| Mean rating* | 4.75 | 4.3 | 4.4 | 4.5 | 4.6 | 4.4 |
| Crust color* | 4.5/4.75 | 4.0/4.25 | 4.25/4.25 | 4.25/4.5 | 4.0/4.0 | 3.5/3.25 |
| Mean rating* | 4.7 | 4.1 | 4.3 | 4.4 | 4.0 | 3.4 |

*Rated on a 5-point subjective scale.

FIG. 1 depicts a flow function graph of unconfirmed failure strength (kPa) to major principal consolidating stress (kPa) for examples 19-23 in experimental Example 2. The reference lines radiating from the origin are, from top to bottom, very cohesive, cohesive, easy flowing, and free-flowing. The whey-based formulations had insignificantly more moisture. Dusting was slightly improved, whereas flow was correspondingly retarded with whey substitution. Improvement in the flow was small when silicon dioxide was increased from 0.12% to 0.18%, with 1% mineral oil.

The bulk density of the 70:30 whey/sugarcane fiber formulations was slightly lower than that of the DPS/sugarcane fiber anticaking compositions, and that of the 65:30 and 60:40 formulations was a little further decreased. Shred separation (anticaking) was decreased using whey instead of dairy product solids (average rating, 4.6 vs. 4.9 in mozzarella, and 4.3 vs. 4.8 in cheddar). Shred appearance was slightly improved: 3.9 against 3.8 in mozzarella and 3.8 against 3.4 in cheddar. Browning of mozzarella upon pizza baking in an impinger oven at 425° F. for 5 min (exit temp 184-185° F.) was perceivably reduced for the whey/sugarcane fiber formulations (3.7 vs. 3.3), particularly in Ex. 21. Though the browning differences were less visible in pizza cooked at 415° F. for 5 min (exit temperature 174-179° F.), the relative intensities were little affected.

Example 3—Three-Component Formulations with Resistant Wheat Starch

The 3-component formulation (Ex. 24) comprising DPS/cellulose/potato starch was modified to replace DPS with whey, cellulose with sugarcane fiber (SCF: SF601), and potato starch with a modified or resistant starch. Modified potato (Emflo™ KV 20 from Emsland-Starke GmbH) behaved well in browning. Emflo™ KV 20 and Emflo™ KVA 20 with resistant wheat starch were included here. The formulations containing 300 ppm natamycin and 0.40% mineral oil were tested for flow, dusting, anticaking in cheddar and mozzarella at a 4% load, and browning on pizza baked at 415° F. for 5 min in an impinger oven.

TABLE 6

Resistant Wheat Starch Formulations

| Ingredients | Example (wt. %) | | | | | | |
|---|---|---|---|---|---|---|---|
| | 24 | 25 | 26 | 27 | 28 | 29 | 30 |
| DPS | 35.13 | 35.13 | — | 35.13 | 35.13 | 35.13 | — |
| Sweet whey | — | — | 35.13 | — | — | — | 35.13 |
| Potato starch Emsland-Stärke | 31.60 | 31.60 | 31.60 | — | — | — | — |
| Cellulose | 32.81 | — | — | — | — | — | — |
| Sugarcane SF601 | — | 32.81 | 32.81 | 32.81 | 32.81 | 32.81 | 32.81 |
| Emflo ™ KV 20 | — | — | — | 31.60 | — | — | 31.60 |
| Emflo ™ KVA20 | — | — | — | — | 31.60 | — | — |
| Gem Star RS Wheat | — | — | — | — | — | 31.60 | — |
| Natamycin | 0.06 | 0.06 | 0.06 | 0.06 | 0.06 | 0.06 | 0.06 |
| Mineral oil | 0.40 | 0.40 | 0.40 | 0.40 | 0.40 | 0.40 | 0.40 |
| Total | 100.0 | 100.0 | 100.0 | 100.0 | 100.0 | 100.0 | 100.0 |
| Moisture | 9.34% | 9.60% | 9.28% | 8.00% | 8.48% | 6.90% | 7.68% |
| Browning | Slow | Slow-moderate | Moderate | Slow-Moderate | Slow | Very slow | Defined |

‡:Blending in CuisineArt ™ for about 10 seconds after adding the dry ingredients and mineral oil and after post-mineral oil manual mixing.
DPS = Dairy product solids. SCF SF601-100 is asugarcane fiber supplied by J. Rettenmaier & Söhne GmbH + Co KG ("JRS").
Sipernat ™ 50 S is a food-grade silicon dioxide.

TABLE 7

Properties of anticake dry blends

| Property | Example | | | | | | |
|---|---|---|---|---|---|---|---|
| | 24 | 25 | 26 | 27 | 28 | 29 | 30 |
| Post-batching visual flow* | 4.5 | 4.0 | 3.5 | 4.0 | 4.5 | 4.5 | 4.25 |
| In-bag dusting* | 3.75 | 3.5 | 3.75 | 4.0 | 3.75 | 3.5 | 3.75 |
| Drop test | | | | | | | |
| Direct visual dusting* | 3.0 | 4.0 | 4.25 | 4.25 | 4.0 | 4.5 | 4.25 |
| Pictorial dusting* | 3.0 | 4.0 | 4.25 | 3.5 | 4.5 | 4.75 | 4.5 |
| Flow (visual)* | 4.5 | 4.0 | 3.75 | 3.75 | 4.25 | 3.75 | 4.0 |
| Pictorial Flow* | 4.5 | 3.75 | 3.5 | 4.0 | 4.25 | 3.75 | 4.0 |
| Overall flow* | 4.5 | 3.9 | 3.6 | 4.0 | 4.3 | 4.0 | 4.1 |
| Overall dusting* | 3.3 | 3.8 | 4.1 | 3.9 | 4.1 | 4.3 | 4.2 |
| Powder Flow Tester | | | | | | | |
| Slope | 0.15 | 0.22 | 0.29 | 0.18 | 0.19 | 0.26 | 0.31 |
| Crit. rat-holing (dia., mm) | 817 | 1304 | 1823 | 1082 | 1027 | 1387 | 1795 |
| MPC stress max. (kPa) | 10.3 | 11.0 | 14.1 | 10.8 | 9.8 | 9.4 | 13.7 |
| Bulk density at 25 kin, g/mL | 0.662 | 0.597 | 0.664 | 0.624 | 0.655 | 0.626 | 0.721 |
| Bulk density (Loose/Tapped) | 0.40/ 0.66 | 0.34/ 0.61 | 0.33/ 0.64 | 0.36/ 0.65 | –/– | –/– | –/– |

*Rated on a 5-point subjective scale.
MPC = Major Principal Consolidating

Figure 2:
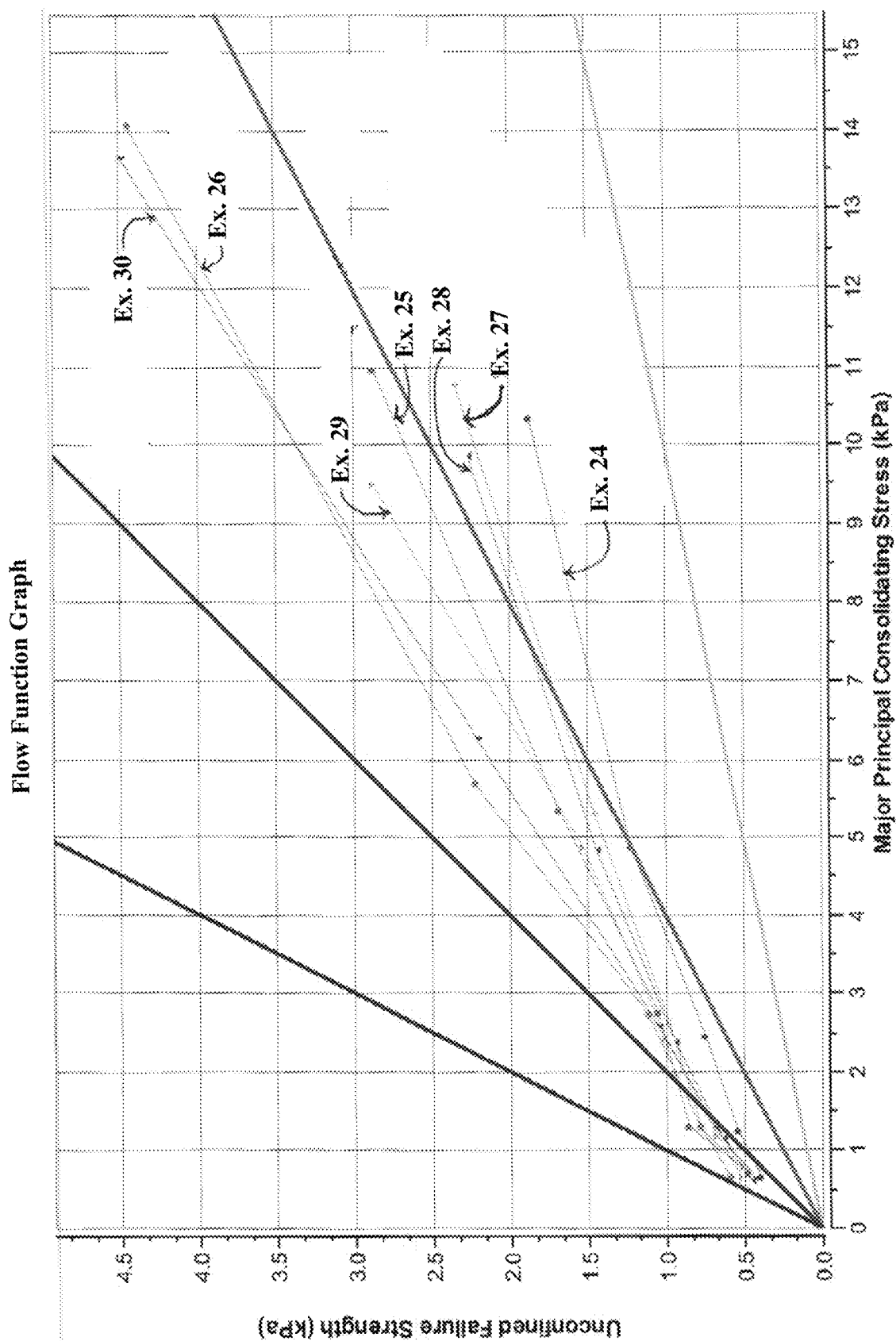
FIG. 2 depicts a flow function graph of unconfirmed failure strength (kPa) to major principal consolidating stress (kPa) for examples 24-30 in Example 3. The reference lines radiating from the origin are, from top to bottom, very cohesive, cohesive, easy flowing, and free-flowing.

FIG. 2 depicts a flow function graph of unconfirmed failure strength (kPa) to major principal consolidating stress (kPa) for examples 24-30 in Example 3. The reference lines radiating from the origin are, from top to bottom, very cohesive, cohesive, easy flowing, and free-flowing. Moisture ranged between 7% and 10%. The tapped bulk density ranged between 0.60 and 0.72 g/mL. Flowability was largely "good." While Ex. 24 had very good flow, Ex. 26 was the least flowable.

Dusting was nearly the inverse function of flow. Ex. 29 (DPS/sugarcane fiber/resistant wheat starch) was the least dusty, whereas Ex. 24 was the most. Ex. 30 had an appreciably higher major principal consolidating (MPC) stress maximum (13.7 kPa) than most other formulations, but it had a high critical rat-holing diameter (1795 mm), indicating that it clogged the hole and did not flow well. The anticaking effect as seen through clumping/shred separation (4.5 in mozzarella and 4.75 in cheddar) was highly acceptable for all formulations. The shred appeared speckled.

Browning on pizza (exit temperature 178-185° F. for the sample mean and 168-191° F. to 177-199° F. for the sample range) was acceptable as compared to plain mozzarella or 2% cellulose. The crust appearance suggested a little under baking. Ex. 27 had the least browning, followed by Ex. 26 and Ex. 28.

Example 4—Two-Component Anticake Compositions with Additional Sweet Whey and/or an Oxygen-Scavenging System This example tested whether sweet whey with or without an oxygen-scavenging system (dextrose/glucose oxidase) in a two-component (DPS/sugarcane) formulation of Example 2 could overcome the appearance problem seen in the three-component system of Example 3. Ex. 19 containing 1% mineral oil and 0.12% silicon dioxide was reformulated with sweet whey replacing the DPS and/or introducing the dextrose/glucose oxidase system. The reformulated products were tested for powder properties and appearance, shred separation (anticaking effect) and browning on pizza.

TABLE 8

| | Example | | | | | | | | | |
|---|---|---|---|---|---|---|---|---|---|---|
| | 19 | 20 | 31 | | 32 | | 33 | | 34 | |
| Ingredient | % | % | % | g | % | g | % | g | % | g |
| DPS | 68.7 | — | 61.7 | 185.1 | — | — | — | — | — | — |
| Sweet whey | — | 68.7 | — | — | 61.7 | 185.1 | 68.7 | 206.2 | 61.7 | 185.1 |
| SCF SF601-100 (JRS) | 30.1 | 30.1 | 27.1 | 81.3 | 27.1 | 81.3 | 29.6 | 88.9 | 26.6 | 79.9 |
| Dextrose monohydrate | — | — | 10.0 | 30.0 | 10.0 | 30.0 | — | — | 10.0 | 30.0 |
| Natamycin | 0.1 | 0.08 | 0.06 | 0.2 | 0.06 | 0.2 | 0.06 | 0.2 | 0.06 | 0.2 |
| Glucose oxidase (DSM, 10 U/mL) | — | — | 0.04 | 0.1 | 0.04 | 0.1 | — | — | 0.04 | 0.1 |

TABLE 8-continued

|  | Example | | | | | | | | | |
|---|---|---|---|---|---|---|---|---|---|---|
|  | 19 | 20 | 31 | | 32 | | 33 | | 34 | |
| Ingredient | % | % | % | g | % | g | % | g | % | g |
| Mineral oil | 1.0 | 1.0 | 1.0 | 3.0 | 1.0 | 3.0 | 1.0 | 3.0 | 1.0 | 3.0 |
| Sipernat ™ 50 S | 0.1 | 0.1 | 0.1 | 0.4 | 0.1 | 0.4 | — | — | — | — |
| TCP | — | — | — | — | — | — | 0.6 | 1.7 | 0.6 | 1.7 |
| Total | 100.0 | 100.0 | 100.0 | 300.0 | 100.0 | 300.0 | 100.0 | 300.0 | 100.0 | 300.0 |
| Dusting at batching* | — | — | 4.0 | | 4.0 | | 4.0 | | 4.0 | |
| Post-batching flow* | — | — | 4.25 | | 4.0 | | 3.75 | | 4.25 | |
| Drop dusting* | 3.0 | 4.0 | 3.5 | | 4.25 | | 4.0 | | 4.25 | |
| Pict. dusting* | 3.5 | 3.75 | 3.5 | | 3.87 | | 4.25 | | 4.5 | |
| Mean dusting* | 3.25 | 3.87 | 3.5 | | 4.1 | | 4.13 | | 4.37 | |
| Drop flow* | 4.5 | 4.0 | 4.0 | | 4.13 | | 4. | | 4.25 | |
| Pict. Flow* | 4.5 | 3.5 | 3.5 | | 4.0 | | 4.25 | | 4.0 | |
| Mean flow* | 4.5 | 3.75 | 3.75 | | 4.0 | | 4.13 | | 4.13 | |

*Rated on a 5-point subjective scale.
DPS = Dairy product solids. SCF SF601-100 is a sugarcane fiber supplied by J. Rettenmaier & Söhne GmbH + Co KG ("JRS").
Sipernat ™ 50 S is a food-grade silicon dioxide.
TCP = tricalcium phosphate.

TABLE 9

Coating of 3-mm Medium Cheddar and 6-mm Mozzarella at 4% Loading

| | Example at 4% Loading | | | | | |
|---|---|---|---|---|---|---|
| Property | 19 | 20 | 31 | 32 | 33 | 34 |
| Cheddar packaged in WhirlPak ™ bags (200 g) after 6 days | | | | | | |
| Shred separation* | 4.75 | 3.75 | 4.5 | 3.5 | 4.0 | 3.13 |
| Surface appearance* | 3.75 | 4.25 | 4.37 | 4.63 | 4.13 | 4.5 |
| Pict. surface appearance* | 4.0 | 4.25 | 4.5 | 4.5 | 4.5 | 4.75 |
| Mean appearance* | 3.87 | 4.25 | 4.43 | 4.56 | 4.32 | 4.63 |
| | Plain Cheddar appearance: 5.0; 2% cellulose (FL 611): 4.0 | | | | | |
| Mozzarella packaged in Ziploc ™ bags (250 g) after 8 days | | | | | | |
| Shred separation* | 4.50 | 4.0 | 4.0 | 4.25 | 4.0 | 3.75 |
| | Plain mozzarella: 3.0; 2% Cellulose: 5.0 | | | | | |
| Surface appearance* | 3.87 | 4.13 | 4.0 | 4.0 | 4.5 | 4.0 |
| | Plain mozzarella.: 4.75; 2% cellulose: 4.0 | | | | | |
| Oven exit temperature (° F.) | 184 (176-195) | 185 (177-195) | 185 (177-195) | 185 (176-196) | 187 (178-199) | 184 (172-195) |
| Direct view* | 4.63 | 4.5 | 4.5 | 4.37 | 4.25 | 4.0 |
| | Plain mozzarella: 4.5, 184 (176-197); 2% cellulose.: 4.25, 185 (176-196) | | | | | |
| Pict. view* | 4.25 | 4.0 | 4.0 | 3.75 | 4.0 | 3.5 |
| | Plain mozzarella: 4.75; 2% cellulose: 4.5 | | | | | |
| Mean browning* | 4.44 | 4.25 | 4.25 | 4.1 | 4.13 | 3.75 |
| | Plain mozzarella: 4.63; 2% cellulose: 4.37 | | | | | |
| Crust color | 4.63 | 4.5 | 4.5 | 4.5 | 4.5 | 4.5 |
| | Plain mozzarella: 4.25; 2% cellulose: 4.5 | | | | | |

*Rated on a 5-point subjective scale. Browning mozzarella on pizza baked in impinger oven at 415° F. (400° F. dry) for 5 min, proceeded with a water tray. Cellulose FL611 is food-grade cellulose fiber from J. Rettenmaier & Söhne GmbH + Co KG ("JRS").

The anticaking effect in cheddar cheese was lower when DPS was replaced with sweet whey and when the enzyme system was used, the latter having a smaller effect. A similar but less prominent result was found in mozzarella. The shred appearance in cheddar with whitish specks on the surface was perceivably improved by using whey instead of DPS and by the enzyme system. The two constituents together additively improved the appearance of cheddar.

Dusting was lower with whey and dextrose. Together the two gave better results than either did alone. Thus, Ex. 19 was the dustiest (3.25), whereas Ex. 34, which had both sweet whey and dextrose/GO, was the least dusty (4.37). While whey impeded flow, dextrose improved it, resulting in combination with desirable flow and dusting. Like shred separation, browning upon pizza baking (at 415° F. for 5 min) increased when DPS was replaced with sweet whey and the dextrose/GO system.

Example 5—Visibility of Anticake Formulations on Cheddar Shreds after 6 Weeks at 40° F.

In this Example, an anticake was formulated with good resistance to browning and clumping but little or no visibility on cheese shreds.

TABLE 10

| Ingredient | \multicolumn{6}{c}{Example (wt. %)} | | | | | |
|---|---|---|---|---|---|---|
| | 35 | 36 | 37 | 38 | 39 | 40 |
| DPS | 45.6 | 37.5 | 41.7 | 37.5 | 38.7 | 58.2 |
| Emflo ™ KV 20 | 30.3 | 34.3 | 38.4 | 34.3 | 35.7 | — |
| Cellulose FL611 | — | — | — | — | — | 21.1 |
| $CaSO_4$ | 20.2 | 24.2 | 16.0 | 24.2 | 24.7 | 19.8 |
| Sorbic acid | 3.0 | 3.0 | 3.0 | — | — | — |
| Potassium sorbate | — | — | — | 3.0 | — | — |
| Natamycin | — | — | — | — | 0.06 | 0.06 |
| Mineral oil | 0.9 | 0.9 | 0.9 | 0.9 | 0.9 | 0.9 |
| Total | 100.0 | 100.0 | 100.0 | 100.0 | 100.0 | 100.0 |

DPS = Dairy product solids.
Emflo ™ KV 20 is Modified Potato Starch from Emsland-Stärke GmbH. Cellulose FL611 is a food-grade cellulose fiber from J. Rettenmaier & Söhne GmbH + Co KG ("JRS").

Lots of 200 g were prepared by mixing dry ingredients for about 7 seconds, adding the mineral oil for about 12 seconds, and scraping the mixture for about 10 seconds. Because the dry blend was too dusty, the mineral oil was increased from 0.55% to 0.90%. No flow agent was needed for batching, so tricalcium phosphate ($Ca_3(PO_4)_2$) was not used. Generally, the dry blends were moderately dusty. Compositions were coated onto 6-mm Supremo Italiano™ low-moisture part-skim (LMPS) mozzarella and 3-mm Schnucks™ medium cheddar in 200, 250, or 300 g lots.

TABLE 11

Coating Examples 35-37 at 4% Loading onto 6-mm Supremo Italiano ™ mozzarella and 3-mm Schnucks ™ medium cheddar

| | \multicolumn{6}{c}{Example at 4% Loading} | | | | | |
|---|---|---|---|---|---|---|
| | \multicolumn{2}{c}{35} | \multicolumn{2}{c}{36} | \multicolumn{2}{c}{37} | | | | |
| Property | Mozz | Ched. | Mozz | Ched. | Mozz | Ched. |
| \multicolumn{7}{c}{After 9 days} | | | | | | |
| Shred separation* | 4.13 | 4.75 | 4.5 | 4.8 | 4.0 | 4.75 |
| Appearance* | — | 4.5 | — | 4.0 | — | 4.13 |
| Excess fines in bag* | 4.5 | 4.5 | 4.0 | 4.5 | 4.25 | 5.0 |
| \multicolumn{7}{c}{After ≥11 days} | | | | | | |
| Appearance* | 3.5 | 4.5 | 3.75 | 4.0 | 4.25 | 4.37 |
| Separation/Clumping* | 3.5 | 4.0 | 3.0 | 3.5 | 4.37 | 4.37 |
| Odor/Flavor* | 3.0 | 4.0 | 3.5 | 4.5 | 3.0 | 4.0 |
| \multicolumn{7}{c}{Browning in impinger oven proceeded with a water tray (150 mL)} | | | | | | |
| Browning* | 437° F. 4.37 | 450° F. 4.0 | 437° F. 4.25 | 450° F. 4.0 | 437° F. 4.25 | 450° F. 4.0 |
| \multicolumn{7}{c}{2% cellulose: 4.25, 184° F.} | | | | | | |
| Exit temp (range) ° F. | 187.4 (171-200) | 189.5 (174-200) | 186.0 (175-196) | 189.5 (174-200) | 185.5 (176-194) | 189.5 (174-200) |
| \multicolumn{7}{c}{Visibility of anticake on cheddar shreds after 6 weeks} | | | | | | |
| Visibility* | — | 4.9 | — | 4.9 | — | 5.0 |

*Rated on a 5-point subjective scale.

TABLE 12

Coating Examples 38-40 at 4% Loading onto 6-mm Supremo Italiano ™ mozzarella and 3-mm Schnucks ™ medium cheddar

| | \multicolumn{6}{c}{Example at 4% Loading} | | | | | |
|---|---|---|---|---|---|---|
| Property | \multicolumn{2}{c}{38} | \multicolumn{2}{c}{39} | \multicolumn{2}{c}{40} | | | | |
| After 9 days | Mozz | Ched. | Mozz | Ched. | Mozz | Ched. |
| Shred separation* | 3.75 | 4.75 | 3.75 | 4.75 | 4.5 | 4.9 |
| Appearance* | — | 4.25 | — | 4.25 | — | 3.5 |
| Excess fines in bag* | 4.37 | 4.5 | 4.0 | 4.5 | 4.25 | 3.5 |
| \multicolumn{7}{c}{After ≥11 days} | | | | | | |
| Appearance* | 4.0 | 4.0 | 4.0 | 4.25 | 4.0 | 3.0 |
| Separation/Clumping* | 3.0 | 4.0 | 3.0 | 4.13 | 4.0 | 4.5 |
| Odor/Flavor* | 4.0 | 4.75 | 4.25 | 4.75 | 4.25 | 4.5 |
| \multicolumn{7}{c}{Browning in impinger oven proceeded with a water tray (150 mL)} | | | | | | |
| Browning* | 437° F. 4.25 | 450° F. 4.0 | 437° F. 4.25 | 450° F. 4.0 | 437° F. 4.25 | 450° F. 4.13 |
| \multicolumn{7}{c}{2% cellulose 4.25, 184° F.} | | | | | | |
| Exit temp (range) ° F. | 184.3 (180-191) | 181.2 (174-189) | 180.2 (170-189) | 181.2 (174-189) | 188.5 (176-201) | 176.1 (171-179) |
| \multicolumn{7}{c}{Visibility of anticake on Cheddar shreds after 6 weeks} | | | | | | |
| Visibility* | — | 4.9 | — | 4.9 | — | 3.5 |

*Rated on a 5-point subjective scale.

The three-component formulation Ex. 37 (41.68% DPS, 38.35% Emflo™ KV-20, 16.04% $CaSO_4$, and 3.03% potassium sorbate) had very good anticaking in both mozzarella and cheddar, excellent browning resistance, and little visibility on the shreds.

Example 6—Low Visibility Anticake Compositions

In this example, decreasing concentrations of calcium sulfate and mineral oil were studied, and replacing the sulfate with DPS in Ex. 42 on the anticake performance in respect of fines visibility, clumping, shred separation and browning on pizza at 450° F. for 5 min. Calcium sulfate was reduced from 38% to 31%, with HOSFO being decreased from 5.0% to 1.75% (Ex. 43) or 1.0% (Ex. 44); or the sulfate was replaced with Dairy Product Solids (DPS) (21%), and HOSFO (1.75%) was substituted with mineral oil using 0.50% (Ex. 45) & 0.20% (Ex. 46) silicon dioxide.

TABLE 13

| Ingredient | Example (wt. %) | | | | | | |
|---|---|---|---|---|---|---|---|
| | 41† | 42† | 42‡ | 43‡ | 44‡ | 45‡ | 46‡ |
| Emflo ™ KVA 20 | 55.7 | — | — | — | — | — | — |
| Potato Starch Emsland-Stärke | — | 55.7 | 55.7 | 67.0 | 68.2 | 77.0 | — |
| Potato starch, 8 wt. % water | — | — | — | — | — | — | 77.3 |
| CaSO₄ US Gypsum | 37.8 | — | — | — | — | — | — |
| CaSO₄ (ACG Materials, T. Alba) | — | 37.8 | 37.8 | 30.8 | 30.8 | — | — |
| DPS (Agromark) | — | — | — | — | — | 20.8 | 20.8 |
| HOSFO | 5.00 | 5.00 | 5.00 | 1.75 | 1.00 | — | — |
| Mineral oil | — | — | — | — | — | 1.75 | 1.75 |
| Sipernat ™ 50 S | 1.50 | 1.50 | 1.50 | 0.50 | — | 0.50 | 0.20 |
| Total | 100.0 | 100.0 | 100.0 | 100.0 | 100.0 | 100.0 | 100.00 |

†KitchenAid ™ & spray process.
‡Cuisinart ™ & drop/pour process.
DPS = Dairy product solids. SCF SF601-100 is a sugarcane fiber supplied by J. Rettenmaier & Söhne GmbH + Co KG ("JRS").
Sipernat ™ 50 S is a food-grade silicon dioxide.
HOSFO is high oleic sunflower oil.

TABLE 14

| | Flow and Dusting | | | | | | |
|---|---|---|---|---|---|---|---|
| | Example | | | | | | |
| Property | 41† | 42† | 42‡ | 43‡ | 44‡ | 45‡ | 46‡ |
| Visual Flow & dust on batching | — | — | — | Sl. dusty | Excellent flow, sl. dusty | Sl. cohesive | Mod. cohesive |
| Drop strokes | 15 | 12 | 7 | 5 | 1 | 4 | 10 |
| Flow rating* | 4.0 | 4.25 | 4.5 | 4.9 | 5.0 | 5.0 | 4.0 |
| Drop dusting* | 5.0 | 4.5 | 4.5 | 4.0 | 3.0 | 4.25 | 4.5 |
| PFT sample weight. (g) | 148.9 | 153.1 | 146.3 | 170.8 | 186.5 | 166.4 | 160.0 |
| PFT slope | 0.45 | 0.40 | 0.41 | 0.26 | 0.22 | 0.30 | 0.37 |
| Crit. rat-holing dia. (mm) | 1028 | 971 | 963 | 632 | 576 | 658 | 726 |

Figure 3:
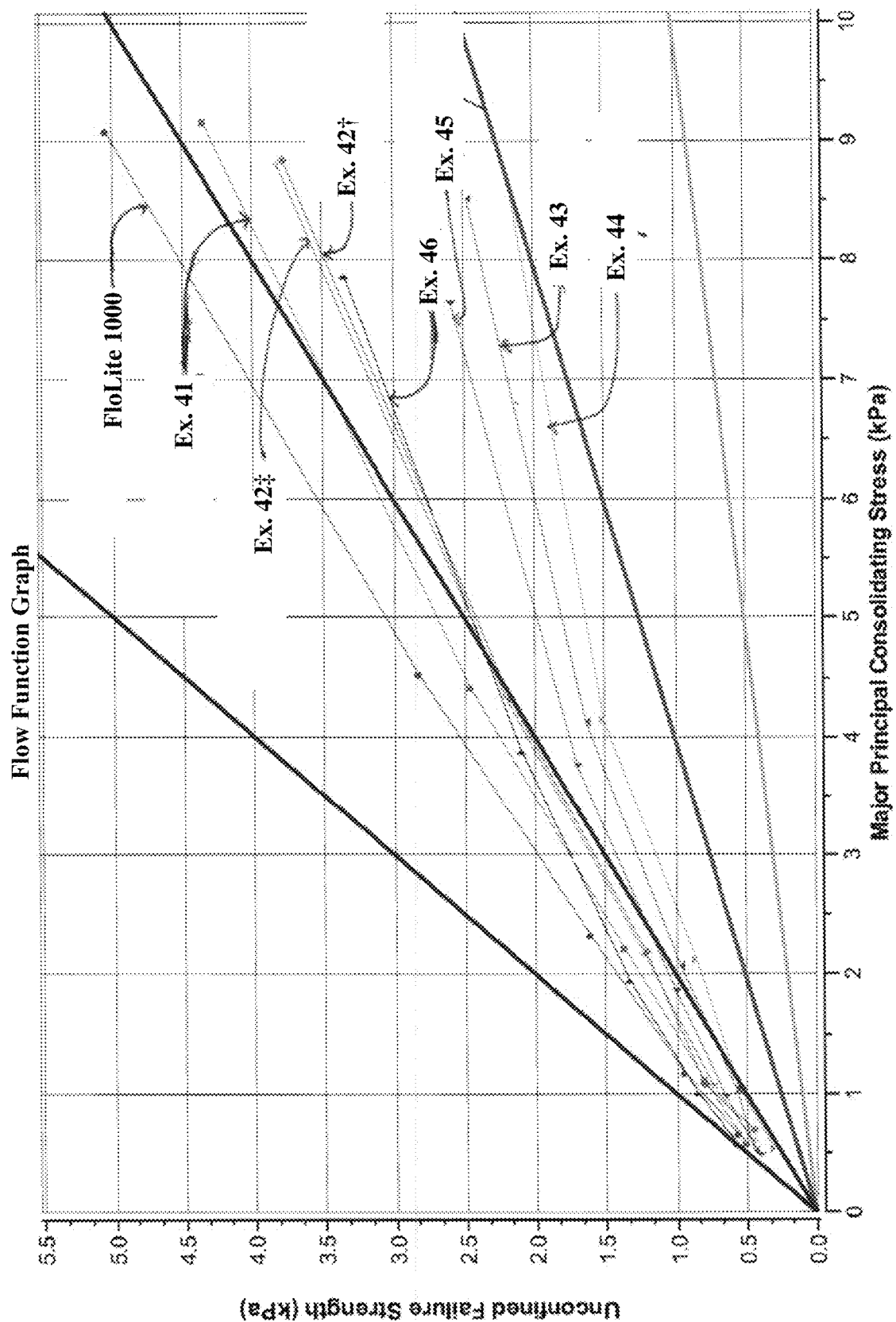
FIG. 3 depicts a flow function graph of unconfirmed failure strength (kPa) to major principal consolidating stress (kPa) for examples 41-46 in Example 6 and comparing to FlowLite 1000 for reference. The reference lines radiating from the origin are, from top to bottom, very cohesive, cohesive, easy flowing, and free-flowing.

*Rated on a 5-point subjective scale.
†KitchenAid & spray process.
‡Cuisinart & drop/pour process.
PFT = Powder Flow Tester FIG. 3 depicts a flow function graph of unconfirmed failure strength (kPa) to major principal consolidating stress (kPa) for examples 41-46 in Example 6 and comparing to FlowLite 1000 for reference. The reference lines radiating from the origin are, from top to bottom, very cohesive, cohesive, easy flowing, and free-flowing. Replacing modified potato with regular potato starch and USG sulfate with ACG sulfate in Ex. 41 gave better flow but slightly increased dusting. Ex. 42 blended in the Cuisinart™ had a slightly better flow than Ex. 42 blended in the KitchenAid™ with no visible impact on dusting. With decreased calcium sulfate (30.8%), 1.75% high oleic sunflower oil (HOSFO), and 0.5% silicon dioxide, Ex. 43 was slightly more cohesive than 1.0% HOSFO alone (Ex. 44), the latter being the flowiest but most dusty of samples tested. Using DPS instead of calcium sulfate together with 1.75% mineral oil and 0.50% silicon dioxide (Ex. 45) or 0.20% silicon dioxide (Ex. 46) resulted in a flow intermediate between Ex. 42 and the reduced-oil formulations (Exs. 43 and 44).

TABLE 14

Coating on Supremo Italiano ™ mozzarella at 4% loading

| Property | 2% Cell. | 41† | 42† | 42‡ | 43‡ | 44‡ | 45‡ | 46‡ |
|---|---|---|---|---|---|---|---|---|
| Residue in tumbler bag (g) | 0.6 (3.0%) | 0.5 (2.5%) | 0.8 (4.0%) | 0.8 (4.0%) | 1.2 (6.0%) | 2.0/1.8 (10.0%/9.0%) | 0.7 (3.5%) | 1.1 (5.5%) |
| Loose fines on sieving (#10) after 10 s | 1.7 (8.5%) | 5.6 (28%) | 6.4 (32%) | 6.3 (31.5%) | 1.2 (6.0%) | 6.0/2.4 (30%/12%) | 4.7 (23.5%) | 6.2 (31%) |
| After 4 days | | | | | | | | |
| Shred separation* | — | 5.0 | 4.75 | 4.5/4.75 | 4.75 | 5.0 | 5.0 | 4.75 |
| Fines visibility* | — | 4.5 | 4.75 | 4.5 | 4.25 | 4.75/4.5 | 4.25 | 4.5 |
| After 8 days | | | | | | | | |
| Visible residue in bag* | 5.0 | 4.5 | 4.5 | 5.0 | 5.0 | 5.0 | 4.75 | 4.75 |
| Shred separation* | 5.0 | 5.0 | 5.0 | 4.75 | 4.9 | 5.0 | 4.25 | 4.0 |
| Fines visibility* | 3.5 | 4.75 | 4.25 | 4.5 | 4.9 | 4.75 | 4.0 | 4.0 |
| Mouth-feel* | 4.5 | 4.25 | 3.75 | 4.5 | 4.0 | 4.0 | 4.0 | 4.25 |
| Mean fines visibility* | — | 4.63 | 4.5 | 4.5 | 4.6 | 4.7 | 4.1 | 4.25 |
| After 17 days | | | | | | | | |
| Shred separation* | — | 5.0 | — | 4.9 | 4.5 | 4.5 | 4.0 | 3.0 |
| Fines visibility* | — | 4.13 | — | 4.75 | 4.8 | 4.9 | 4.5 | 4.37 |
| Mouthfeel* | — | 4.25 | — | 4.0 | 4.13 | 4.25 | 4.13 | 4.5 |

*Rated on a 5-point subjective scale.
†KitchenAid & spray process.
‡Cuisinart & drop/pour process. Short tumbling process of 30 strokes over about 20-25 seconds.

TABLE 15

Coating on Schnucks ™ medium cheddar at 4% loading

| Property | 41† | 42† | 42‡ | 43‡ | 44‡ | 45‡ | 46‡ |
|---|---|---|---|---|---|---|---|
| Residue in tumbler bag (g) | — | 0.7 (7%) | — | 0.7 (7%) | 0.6 (6%) | 0.4 (4%) | 0.3 (3%) |
| Loose fines on sieving (#10) after 10 s | — | — | — | 2.62 (13.1%) | 2.62 (13.1%) | 1.33 (13.3%) | — |
| After 6 days | | | | | | | |
| Visible Residue in bag* | — | 4.75 | — | 5.0 | 5.0 | 5.0 | 4.5 |
| Shred Separation* | — | 5.0 | — | 5.0 | 5.0 | 5.0 | 5.0 |
| Fines visibility* | — | 4.25 | — | 4.25 | 4.5 | 4.5 | 4.5 |
| After 15 days | | | | | | | |
| Fines visibility* | — | 4.63/4.63 | 4.5 | 4.4 | 4.8 | 4.9 | 3.75 |

*Rated on a 5-point subjective scale.
†KitchenAid & spray process.
‡Cuisinart & drop/pour process. Short tumbling process of 30 strokes over about 20-25 seconds.

The anticake visibility rating for mozzarella and cheddar matched well. The formulation with reduced sulfate and mineral oil showed improved fines visibility, especially with the lower level of HOSFO (1.0%) with no flow agent Ex. 44) or 0.5% silicon dioxide (Ex. 43). Ex. 45, which had DPS instead of calcium sulfate and contained 1.75% mineral oil and 0.50% silicon dioxide, also showed good visibility. Fines visibility generally improved over the first few days, and up to about 2 weeks, after loading.

TABLE 16

Results of browning on pizza baked in impinger over at 435° F. for 5 min with a forerunning water tray (150 mL)

| Property | Example at 4% Loading | | | | | |
|---|---|---|---|---|---|---|
|  | 41† | 42† | 42‡ | 43‡ | 44‡ | 45‡ | 46‡ |
| Browning | 4.0/4.25 | 4.25 | — | 4.0 | 3.5 | 4.0 | 3.0 |
|  |  |  |  | 2% cellulose: 4.0 |  |  |  |
| Cheese temp. (° F.) | 185.7 (180-191)/ 193.5 (190-197) | 192.9 (186-199) | — | 191.6 (181-198) | 188.1 (183-195) | 191.1 (184-196) | 186.9 (182-193) |
| Shred definition | Defined in underlayer | Defined in underlayer | — | Mod. in underlayer | Mod. in underlayer | Mod. in underlayer | Mod. in underlayer |

*Rated on a 5-point subjective scale.
†KitchenAid & spray process.
‡Cuisinart & drop/pour process.

Pizza was prepared with 12" thin crust, 113 g Ragu™ pizza sauce, and 200 g cheese, baked in an impinger oven at a set temperature of 450° F. for 5 min (measured temperature of 435° F.). Examples 43-46 at 4% loading on mozzarella did not lose any significant browning resistance compared to Exs. 41 or 42 or 2% cellulose. However, while cheese melt at the surface was normal, the underlayer retained shred definitions, thus restricting the stretchability. DPS ameliorated melt resistance.

Calcium sulfate replaced with DPS (21%) in the presence of 1.75% mineral oil and 0.50% silicon dioxide Ex. 45 had good flow (slope 0.30 and a critical rat-holing diameter of 658 mm) with moderate dusting. For less dusting, Ex. 45 can be prepared with 0.25-0.35% silicon dioxide instead. Reduced calcium sulfate (31%), mineral oil (1.75%), and silicon dioxide in the Ex. 43 gave a little better flow (slope 0.26 and a critical rat-holing diameter of 632 mm) than Ex. 45 but had a comparable dusting.

Example 7—Further Low Visibility Anticake Compositions

The anticaking agents of Table 17 were prepared and tested for anticaking, visibility, and browning (Table 18).

TABLE 17

| Ingredient | Example (wt. %) | | | | |
|---|---|---|---|---|---|
|  | 47 | 48 | 49 | 50 | 51 |
| Whey permeate powder | 20.5 | 48.0 | 68.8 | 28.5 | 21.9 |
| Calcium sulfate | — | 2.0 | — | 2.0 | 2.0 |
| Sugarcane fiber | — | — | 30.1 | — | — |
| Potato starch | 79.0 | — | — | 67.5 | 60.0 |
| Corn starch | — | 48.0 | — | — | — |
| TCP | — | 2.0 | — | — | — |
| HOSFO | — | — | — | — | 4.6 |
| Dextrose | — | — | — | — | 10.0 |
| Glucose oxidase | — | — | — | — | 0.05 |
| Natamycin | — | — | — | — | 0.04 |
| Sipernat™ 22LS | 0.10 | — | 0.12 | 0.35 | 1.5 |
| Mineral oil | 0.40 | — | 1.00 | 1.75 | — |
| Total | 100.0 | 100.0 | 100.0 | 100.0 | 100.0 |

Sipernat™ 22 LS is a food-grade silicon dioxide.
HOSFO is high oleic sunflower oil.
TCP is tricalcium phosphate.

TABLE 18

Coating on Supremo Italiano™ Mozzarella at 4% Loading

| Property | Example (wt. %) | | | |
|---|---|---|---|---|
|  | 47 | 48 | 49 | 2% cellulose |
| Residue in tumbler bag, g (%) | 0.2 (2%) | 1.0 (10%) | 1.1 (11%) | 0.7 (14%) |
| Loose anticake** on sieving through #10, g (%) | 3.8 (38%) | 4.0 (40%) | 3.0 (30%) | 2.2 (44%) |
| Shred separation after 4 days* | 4.75 | 4.5 | 4.25 | — |
| Visibility (4 days)* | 3.5 | 4.9 | 4.0 | — |
| Cheese temp. (° F., range) | 193 (191-199) | 186 (181-189) | 192 (189-197) | — |
| Browning* | 4.0 | 3.75 | 3.75 | — |
| Stretch* | 4.0 | 3.75 | 4.0 | — |

*Rated on a 5-point subjective scale.
**Includes a considerable portion of cheese fines coated with the anticake composition.
Browning was tested with pizza baked in an impinger oven at 450° F. for 5 min.

Figure 4:
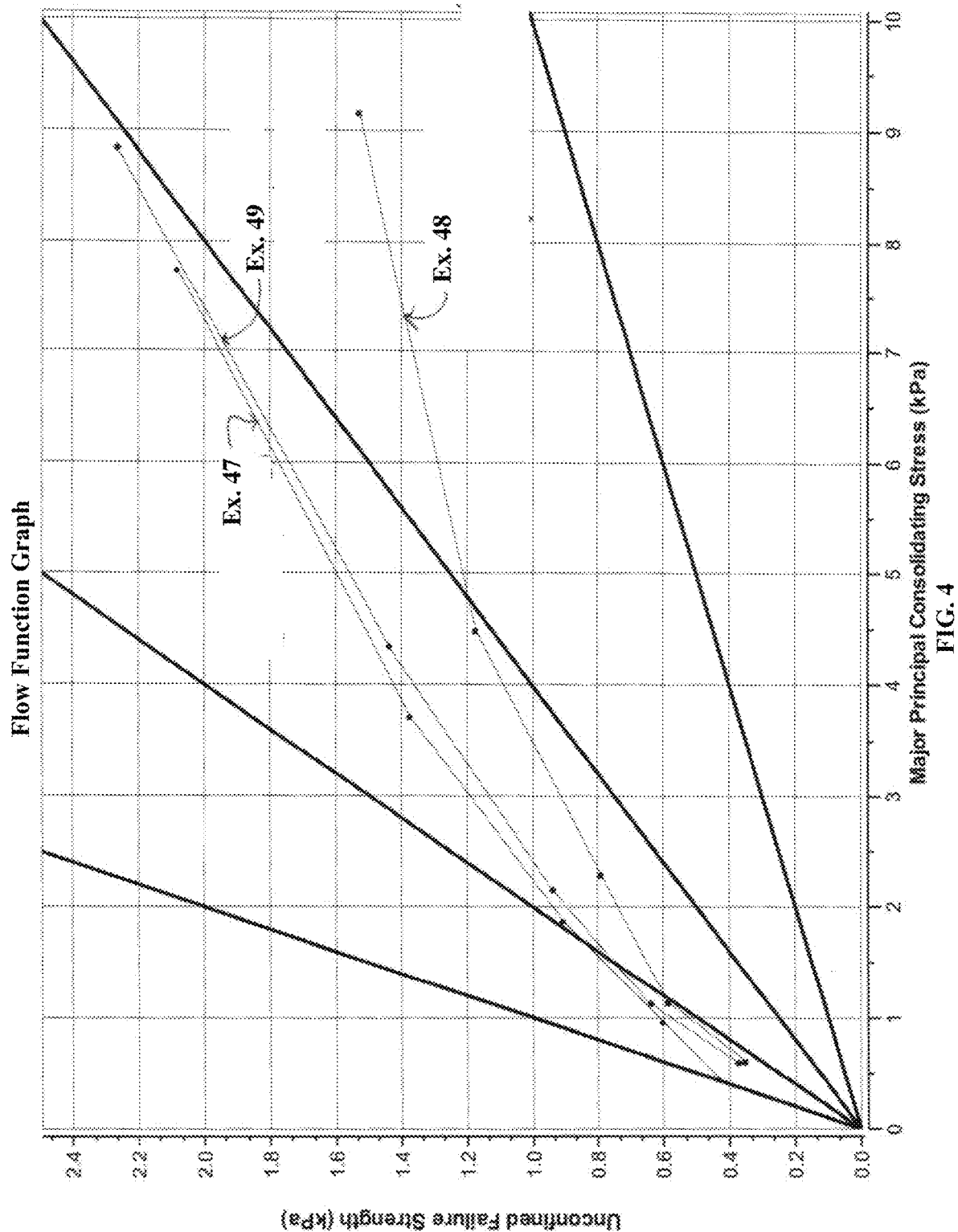
FIG. 4 depicts a flow function graph of unconfirmed failure strength (kPa) to major principal consolidating stress (kPa) for examples 47-49 in Example 7. The reference lines radiating from the origin are, from top to bottom, very cohesive, cohesive, easy flowing, and free-flowing.

FIG. 4 depicts a flow function graph of unconfirmed failure strength (kPa) to major principal consolidating stress (kPa) for examples 47-49 in Example 7. The reference lines radiating from the origin are, from top to bottom, very cohesive, cohesive, easy flowing, and free-flowing. The anticaking effect of shred separation was good to very good for Examples 47-49. Visibility ranged from fair (3.5, Ex. 47) to excellent (4.9, Ex. 48). Browning at cheese temperature of 186-193° F. was moderate, with Ex. 47 being slightly better than the others (4.25 for Ex. 48, and 4.0 for Ex. 49). Stretchability was good in all three anticaking compositions, but Ex. 48 exhibited a little less stretch than the other two. The good stretchability coincided with good melt evinced by the near absence of un-melted shreds in the top and underlayers of the cheese.

What is claimed is:
1. An anticaking agent for cheese, comprising:
   20-70 wt. % one or more dairy ingredients chosen from milk permeate powder, deproteinized whey, whey permeate powder, and combinations thereof; and
   30-80 wt. % one or more non-dairy ingredients comprising starch and fiber and optionally flour;
   wherein the anticaking agent when applied to a divided cheddar cheese has little to no visibility on the divided cheddar cheese compared to the divided cheddar cheese without the anticaking agent, prevents caking of the divided cheddar cheese, and browns similarly to divided cheddar cheese without the anticaking agent when baked in an impinger oven at between 425° F. and 450° F. for 5 minutes.

2. The anticaking agent of claim 1, comprising 46-70 wt. % milk permeate powder.

3. The anticaking agent of claim 1, comprising 20-70 wt. % whey permeate powder.

4. The anticaking agent of claim 1, comprising 60-65 wt. % deproteinized whey.

5. The anticaking agent of claim 1, comprising 2-15 wt. % calcium sulfate.

6. The anticaking agent of claim 1, comprising 9.5-40 wt. % cellulose.

7. The anticaking agent of claim 1, comprising 48-80 wt. % starch.

8. The anticaking agent of claim 1, wherein the starch is chosen from potato starch, tapioca starch, and modified food starch.

9. The anticaking agent of claim 1, comprising 25-30.2 wt. % sugarcane fiber.

10. The anticaking agent of claim 1, comprising 9.7-20 wt. % dextrose and 0.04-0.05 wt. % glucose oxidase.

11. The anticaking agent of claim 1, comprising 0.06-0.08 wt. % natamycin.

12. The anticaking agent of claim 1, comprising 10 wt. % potassium sorbate.

13. The anticaking agent of claim 1, comprising 0.02-1.5 wt. % silicon dioxide.

14. The anticaking agent of claim 1, comprising 0.01-5 wt. % mineral oil.

15. The anticaking agent of claim 1, wherein the fiber comprises sugarcane fiber.

16. The anticaking agent of claim 1, comprising:
- 40-70 wt. % one or more dairy ingredients chosen from milk permeate powder, whey permeate powder, deproteinized whey, and combinations thereof;
- 30-51 wt. % starch; and
- 30-60 wt. % one or more non-dairy ingredients comprising fiber and optionally flour;
- wherein the anticaking agent when applied to a divided cheddar cheese has little to no visibility on the divided cheddar cheese compared to the divided cheddar cheese without the anticaking agent, prevents caking of the divided cheddar cheese, and browns similarly to divided cheddar cheese without the anticaking agent when baked in an impinger oven at between 425° F. and 450° F. for 5 minutes.

17. The anticaking agent of claim 16, comprising 48-79 wt. % corn starch or potato starch.

18. A food product comprising:
  a. a divided cheese comprising a plurality of individual cheese particles; and
  b. an anticaking agent of claim 1 dispersed on the plurality of individual cheese particles in an amount sufficient to inhibit caking of the plurality of individual cheese particles.

19. The food product of claim 18, wherein said anticaking agent is applied at between 1 wt. % and 6 wt. % of the divided cheese.

20. A method of treating divided cheese for anticaking, comprising:
- dispersing the anticaking agent of claim 1 over a divided cheese;
- wherein the anticaking agent has little to no visibility on the divided cheddar cheese compared to the divided cheddar cheese without the anticaking agent, prevents caking of the divided cheddar cheese, and browns similarly to divided cheddar cheese without the anticaking agent when baked in an impinger over at between 425° F. and 450° F. for 5 minutes.

21. The method of claim 20, wherein said anticaking agent is applied at between 1 wt. % and 6 wt. % of the divided cheese.

* * * * *